United States Patent
Hill et al.

(10) Patent No.: US 8,196,207 B2
(45) Date of Patent: Jun. 5, 2012

(54) CONTROL AUTOMATION TOOL

(75) Inventors: Marshell L. Hill, Flower Mound, TX (US); Daniel Yomine, Trophy Club, TX (US); Dennis Aligno, Plano, TX (US); Johnna Carter, Richardson, TX (US); Tianay Carroll, Coppell, TX (US); Ajay Barve, Coppell, TX (US)

(73) Assignee: Bank of America Corporation, Charlotte, NC (US)

( * ) Notice: Subject to any disclaimer, the term of this patent is extended or adjusted under 35 U.S.C. 154(b) by 216 days.

(21) Appl. No.: 12/713,775

(22) Filed: Feb. 26, 2010

(65) Prior Publication Data

US 2010/0199352 A1 Aug. 5, 2010

Related U.S. Application Data

(63) Continuation-in-part of application No. 12/260,422, filed on Oct. 29, 2008.

(51) Int. Cl.
*G06F 11/00* (2006.01)
*H04L 9/00* (2006.01)

(52) U.S. Cl. ............... 726/25; 726/26; 726/27; 726/28; 726/29; 726/30; 713/187; 713/188; 713/189; 713/190

(58) Field of Classification Search ............ 726/25
See application file for complete search history.

(56) References Cited

U.S. PATENT DOCUMENTS

| | | | |
|---|---|---|---|
| 2002/0018269 A1 | 2/2002 | Chaudhuri et al. | |
| 2002/0030864 A1 | 3/2002 | Chaudhuri et al. | |
| 2002/0109879 A1 | 8/2002 | Wing So | |
| 2003/0018513 A1 | 1/2003 | Hoffman et al. | |
| 2003/0028412 A1 | 2/2003 | Hoffman et al. | |
| 2003/0040986 A1 | 2/2003 | Hoffman et al. | |
| 2003/0041001 A1 | 2/2003 | Hoffman et al. | |
| 2003/0046089 A1 | 3/2003 | Menninger et al. | |
| 2003/0046120 A1 | 3/2003 | Hoffman et al. | |
| 2003/0046121 A1 | 3/2003 | Menninger et al. | |
| 2003/0046136 A1 | 3/2003 | Hoffman et al. | |
| 2003/0046190 A1 | 3/2003 | Hoffman et al. | |
| 2003/0046214 A1 | 3/2003 | Menninger | |
| 2003/0048301 A1 | 3/2003 | Menninger | |
| 2003/0050807 A1 | 3/2003 | Hoffman et al. | |

(Continued)

OTHER PUBLICATIONS

International Search Report for PCT/US11/26111 dated Apr. 25, 2011.

*Primary Examiner* — Longbit Chai
(74) *Attorney, Agent, or Firm* — Michael A. Springs; Moore & Van Allen PLLC; Patrick B. Horne

(57) ABSTRACT

A control automation tool ("CAT") is configured for supporting discrete management of controls and their corresponding metrics. The control automation tool includes a software application connected with, stored on, and executed by one or more relational, closed-loop data repositories and computer systems. The use and maturation of a control within an organization depends on management of operational performance and expenses, which the CAT assists through lean project management, effective implementation of action plans and financial functions. Further, people resources, organizational hierarchy and access management functions are used to support mapping of controls arranged by organizational unit and support access permissions that are consistent with appropriate data management. The CAT also provides transparency and meaning to control and metric status and relevant data regarding controls and their associated metrics and is configured for ease of control and metric management via the CAT interface.

42 Claims, 31 Drawing Sheets

U.S. PATENT DOCUMENTS

| | | |
|---|---|---|
| 2003/0050808 A1 | 3/2003 | Mor |
| 2003/0050809 A1 | 3/2003 | Hoffman et al. |
| 2003/0050822 A1 | 3/2003 | Hoffman et al. |
| 2003/0050823 A1 | 3/2003 | Gehman et al. |
| 2003/0050828 A1 | 3/2003 | Hoffman et al. |
| 2003/0050845 A1 | 3/2003 | Hoffman et al. |
| 2003/0050859 A1 | 3/2003 | Rodriguez et al. |
| 2003/0050867 A1 | 3/2003 | Menninger et al. |
| 2003/0050868 A1 | 3/2003 | Hoffman et al. |
| 2003/0055692 A1 | 3/2003 | Menninger |
| 2003/0055693 A1 | 3/2003 | Hoffman et al. |
| 2003/0055694 A1 | 3/2003 | Menninger |
| 2003/0055700 A1 | 3/2003 | Hoffman et al. |
| 2003/0055704 A1 | 3/2003 | Reece |
| 2003/0055708 A1 | 3/2003 | Hoffman et al. |
| 2003/0055709 A1 | 3/2003 | Hoffman et al. |
| 2003/0055710 A1 | 3/2003 | Burk et al. |
| 2003/0055731 A1 | 3/2003 | Fouraker et al. |
| 2003/0055734 A1 | 3/2003 | Hoffman et al. |
| 2003/0055750 A1 | 3/2003 | Menninger |
| 2003/0061084 A1 | 3/2003 | Menninger |
| 2003/0061102 A1 | 3/2003 | Menninger et al. |
| 2003/0061124 A1 | 3/2003 | Menninger et al. |
| 2003/0061125 A1 | 3/2003 | Hoffman et al. |
| 2003/0061130 A1 | 3/2003 | Hoffman et al. |
| 2003/0061174 A1 | 3/2003 | Menninger |
| 2003/0065541 A1 | 4/2003 | Menninger |
| 2003/0065549 A1 | 4/2003 | Hoffman et al. |
| 2003/0065550 A1 | 4/2003 | Hoffman et al. |
| 2003/0065551 A1 | 4/2003 | Hoffman et al. |
| 2003/0065557 A1 | 4/2003 | Hoffman et al. |
| 2003/0065627 A1 | 4/2003 | Menninger |
| 2003/0066886 A1 | 4/2003 | Hoffman et al. |
| 2003/0069765 A1 | 4/2003 | Menninger |
| 2003/0069766 A1 | 4/2003 | Hoffman et al. |
| 2003/0069767 A1 | 4/2003 | Menninger |
| 2003/0069768 A1 | 4/2003 | Hoffman et al. |
| 2003/0069769 A1 | 4/2003 | Hoffman et al. |
| 2003/0069770 A1 | 4/2003 | Burk et al. |
| 2003/0069771 A1 | 4/2003 | Menninger et al. |
| 2003/0069774 A1 | 4/2003 | Hoffman et al. |
| 2003/0069778 A1 | 4/2003 | Menninger et al. |
| 2003/0069779 A1 | 4/2003 | Menninger et al. |
| 2003/0069786 A1 | 4/2003 | Hoffman et al. |
| 2003/0069791 A1 | 4/2003 | Menninger |
| 2003/0069794 A1 | 4/2003 | Hoffman et al. |
| 2003/0069798 A1 | 4/2003 | Hoffman |
| 2003/0069799 A1 | 4/2003 | Hoffman et al. |
| 2003/0069813 A1 | 4/2003 | Burk |
| 2003/0069814 A1 | 4/2003 | Hoffman et al. |
| 2003/0069818 A1 | 4/2003 | Menninger |
| 2003/0069823 A1 | 4/2003 | Hoffman et al. |
| 2003/0069824 A1 | 4/2003 | Menninger |
| 2003/0069825 A1 | 4/2003 | Hoffman et al. |
| 2003/0069859 A1 | 4/2003 | Hoffman et al. |
| 2003/0074205 A1 | 4/2003 | Menninger |
| 2003/0074206 A1 | 4/2003 | Hoffman et al. |
| 2003/0074237 A1 | 4/2003 | Sechrist et al. |
| 2003/0074238 A1 | 4/2003 | Hoffman et al. |
| 2003/0074239 A1 | 4/2003 | Hoffman et al. |
| 2003/0074249 A1 | 4/2003 | Hoffman et al. |
| 2003/0074250 A1 | 4/2003 | Burk |
| 2003/0074262 A1 | 4/2003 | Hoffman et al. |
| 2003/0074263 A1 | 4/2003 | Hoffman et al. |
| 2003/0074264 A1 | 4/2003 | Hoffman |
| 2003/0074281 A1 | 4/2003 | Hoffman et al. |
| 2003/0074285 A1 | 4/2003 | Hoffman et al. |
| 2003/0074355 A1 | 4/2003 | Menninger et al. |
| 2003/0078787 A1 | 4/2003 | Hoffman et al. |
| 2003/0078818 A1 | 4/2003 | Hoffman et al. |
| 2003/0078819 A1 | 4/2003 | Hoffman et al. |
| 2003/0078827 A1 | 4/2003 | Hoffman |
| 2003/0078845 A1 | 4/2003 | Hoffman et al. |
| 2003/0078846 A1 | 4/2003 | Burk et al. |
| 2003/0078860 A1 | 4/2003 | Hoffman et al. |
| 2003/0078861 A1 | 4/2003 | Hoffman et al. |
| 2003/0083909 A1 | 5/2003 | Hoffman et al. |
| 2003/0083918 A1 | 5/2003 | Hoffman et al. |
| 2003/0083947 A1 | 5/2003 | Hoffman et al. |
| 2003/0088449 A1 | 5/2003 | Menninger |
| 2003/0088474 A1 | 5/2003 | Hoffman et al. |
| 2003/0097317 A1 | 5/2003 | Burk et al. |
| 2004/0093298 A1 | 5/2004 | McClure, III et al. |
| 2004/0193482 A1 | 9/2004 | Hoffman et al. |
| 2004/0236621 A1 | 11/2004 | Eder |
| 2005/0060245 A1 | 3/2005 | Hoffman et al. |
| 2005/0086530 A1* | 4/2005 | Goddard ................... 713/201 |
| 2006/0015416 A1 | 1/2006 | Hoffman et al. |
| 2006/0053043 A1 | 3/2006 | Clarke |
| 2006/0059253 A1 | 3/2006 | Goodman et al. |
| 2006/0064481 A1 | 3/2006 | Baron et al. |
| 2006/0064485 A1 | 3/2006 | Baron et al. |
| 2006/0064486 A1 | 3/2006 | Baron et al. |
| 2006/0095915 A1 | 5/2006 | Clater |
| 2006/0161444 A1 | 7/2006 | Lubrecht et al. |
| 2006/0161879 A1 | 7/2006 | Lubrecht et al. |
| 2006/0206246 A1 | 9/2006 | Walker |
| 2007/0226099 A1 | 9/2007 | Senturk-Doganaksoy et al. |
| 2007/0288208 A1 | 12/2007 | Grigsby et al. |
| 2008/0047016 A1 | 2/2008 | Spoonamore |
| 2008/0086342 A1 | 4/2008 | Curry et al. |
| 2008/0208667 A1 | 8/2008 | Lymbery et al. |
| 2008/0221944 A1 | 9/2008 | Kelly |
| 2008/0222734 A1 | 9/2008 | Redlich et al. |
| 2008/0243524 A1 | 10/2008 | Agrawal et al. |
| 2008/0270448 A1 | 10/2008 | Brennan et al. |
| 2009/0254572 A1 | 10/2009 | Redlich et al. |
| 2009/0265787 A9 | 10/2009 | Baudoin et al. |
| 2010/0010968 A1 | 1/2010 | Redlich et al. |

* cited by examiner

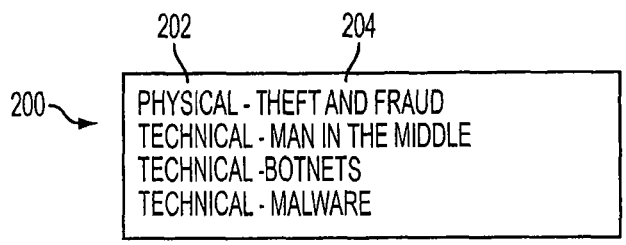

FIG. 2A

| | A | D | E | F |
|---|---|---|---|---|
| | THREAT | IMPACT | PROBABILITY | RISK |
| 2 | PHYSICAL - THEFT AND FRAUD —214 | 5 | 5 | 25 |
| 3 | TECHNICAL - MAN IN THE MIDDLE | 3 | 5 | 15 |
| 4 | TECHNICAL -BOTNETS | 3 | 5 | 15 |
| 5 | TECHNICAL - MALWARE | 3 | 5 | 15 |
| 6 | TECHNICAL - COMPUTING INFRASTRUCTURE MALFUNCTION | 3 | 5 | 15 |
| 7 | TECHNICAL - NETWORK INFRASTRUCTURE FAILURE | 5 | 3 | 15 |
| 8 | PEOPLE - ESPIONAGE AND INSIDER THREAT | 3 | 3 | 9 |
| 9 | TECHNICAL - DENIAL OF SERVICE | 5 | 1 | 5 |
| 10 | PEOPLE - TECHNICAL SUBTERFUGE (--ISHING) | 1 | 5 | 5 |
| 11 | PEOPLE - LOST LAPTOP/CPU/MOBILE DEVICE | 1 | 5 | 5 |
| 12 | TECHNICAL - SPAM | 1 | 5 | 5 |
| 13 | PEOPLE - SOCIAL ENGINEERING | 1 | 3 | 3 |
| 14 | TECHNICAL - UNAUTHORIZED ACCESS (XSS, SQL INJECTION) | 3 | 3 | 9 |
| 15 | TECHNICAL - ZERO-DAY THREAT | 3 | 1 | 3 |
| 16 | TECHNICAL - SNIFFING | 3 | 1 | 3 |
| 17 | TECHNICAL - INFORMATION WARFARE AND DENIAL OF SPACE | 1 | 1 | 1 |
| 18 | PEOPLE - SHOULDER SURFING | 1 | 1 | 1 |
| 19 | PROCESS - PROCESS FAILURE | 1 | 1 | 1 |
| 20 | TECHNICAL - ELECTROMAGNETIC PULSE | 1 | 1 | 1 |
| 21 | TECHNICAL - COMMUNICATIONS FAILURE | 1 | 1 | 1 |
| 22 | PHYSICAL - BOMBING | 0 | 0 | 0 |
| 23 | PHYSICAL - DUMPSTER DIVING | 0 | 0 | 0 |
| 24 | PHYSICAL - SABOTAGE AND VANDALISM | 0 | 0 | 0 |

FIG. 2B

| PROCESS/ CONTROL | COVERAGE TYPE | METRICS | | |
|---|---|---|---|---|
| | | COVERAGE | RISK | BEHAVIOR |
| NPI (UNENCRYPTED) | DETECTIVE | 90% | # OF NPI VIOLATIONS | # OF REPEAT OFFENDERS |
| ANTI-VIRUS | DETECT & PREVENT | 95% | # OF QUARANTINED INFECTIONS | # OF USERS WITH HIGH INFECTION RATE |
| PROXY BLOCK | PREVENTATIVE | 95% | # OF SITES BLOCKED WITH DATA LOSS VECTOR | NO |
| NPI (ENCRYPTED) | | NO | NO | NO |

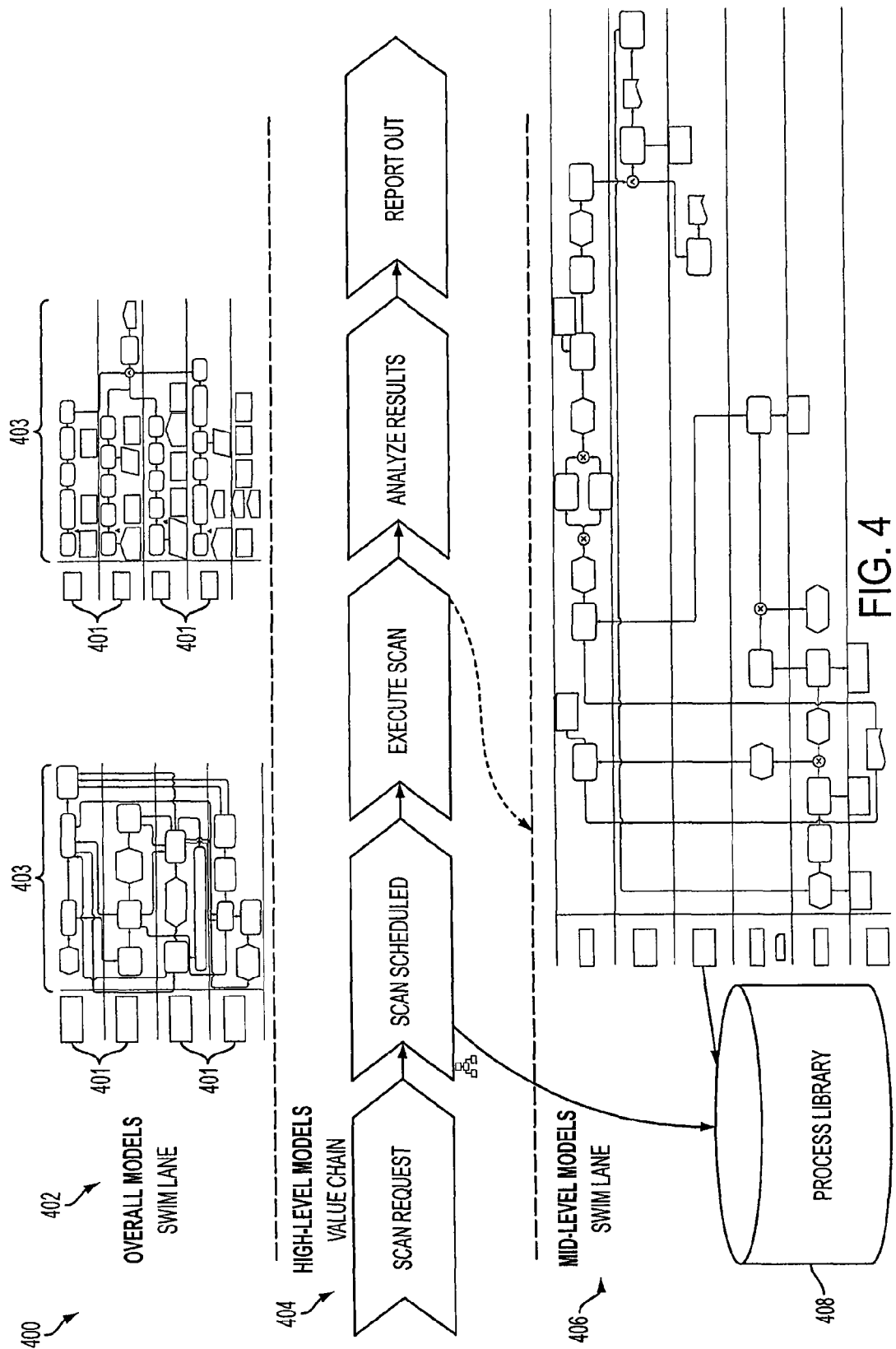

| PRO-GRAM | FUNC-TION | PRODUCTS & SERVICES · CONTROLS · | VULNERABILITY MANAGEMENT PROCESSES | MATURITY LEVEL - CURRENT - NON-EXISTENT INITIAL REPEATABLE DEFINED MANAGED OPTIMIZED |
|---|---|---|---|---|
| REMEDIATION & REPORTING | | | | |
| | REMEDIATION | | | |
| | | COMPLIANCE REMEDIATION | | REPEATABLE — 509 |
| | | | ESM - SERVER COMPLIANCE REMEDIATION | REPEATABLE — 510 |
| | | | ESM - DATABASE COMPLIANCE REMEDIATION | REPEATABLE |
| | | | FIREWALL RULESET REMEDIATION | NON-EXISTENT/NEW — 512 |
| | | | RED RULE APPROVAL PROCESS | REPEATABLE |
| | | | ROGUE WIRELESS DEVICE REMEDIATION | REPEATABLE |
| | | | LAPTOP/DESKTOP COMPLIANCE REMEDIATION | NON-EXISTENT/NEW |
| | | | NETWORK/INFRASTRUCTURE COMPLIANCE REMEDIATION | REPEATABLE |

FIG. 5A

| PRO-GRAM | FUNC-TION | · CONTROLS · | INSIDER THREAT | UNINTENTIONAL ERROR | SOCIAL ENGINEERING | MAL-WARE | BOTNET/DDoS | FRAUD | -ISHING | UNAUTHORIZED ACCESS | ZERO DAY | MAN-IN-THE-MIDDLE |
|---|---|---|---|---|---|---|---|---|---|---|---|---|
| REMEDIATION & REPORTING | | | | | | | | | | | | |
| | REMEDIATION | | | | | | | | | | | |
| | | COMPLIANCE REMEDIATION | 81 | | | | | 9 | | 3 | | |

FIG. 5B

| THREAT | | PROCESS/ CONTROL | METRICS | | | | CURRENT LEVEL | TARGET LEVEL |
|---|---|---|---|---|---|---|---|---|
| | | | COVERAGE TYPE | COVERAGE | RISK | BEHAVIOR | | |
| INSIDER THREAT | TARGET SPAN OF CONTROL (ALL KNOWN THREAT VECTORS) | NPI (UNENCRYPTED) | DETECTIVE | | 90% | # OF NPI VIOLATIONS | # OF REPEAT OFFENDERS | DEFINED | DEFINED |
| | CURRENT SPAN OF CONTROL | ANTI-VIRUS | DETECT & PREVENT | | 95% | # OF QUARANTINED INFECTIONS | # OF USERS WITH HIGH INFECTION RATE | DEFINED | DEFINED |
| | | PROXY BLOCK | PREVENTATIVE | | 95% | # OF SITES BLOCKED WITH DATA LOSS VECTOR. | NO | INITIAL | REPEATABLE |
| | GAP | NPI (ENCRYPTED) | NO | | NO | NO | NO | NON-EXISTENT | INITIAL |

FIG. 8

| PRODUCT & SERVICE | IDENTIFIED PLANS / PROCESSES / PROCEDURES | CURRENT MATURITY | CURRENT MATURITY GAPS & DELIVERABLES | PRIORITY | RISK | TARGET DATE | STATUS | NEXT MATURITY STEPS | TARGET MATURITY (BASED ON GIPBC CONTROLS INVENTORY- REVISED) | NOTES | PROCESS OWNERSHIP |
|---|---|---|---|---|---|---|---|---|---|---|---|
| | CPE RESPONSIBILITY: | MATURITY LEVEL AS OF THE MOST RECENT ASSESSMENT | SEE PROCESS TRACKING- GAPS THAT EXIST FOR THE CURRENT MATURITY LEVEL & DELIVERABLE(S) REQUIRED TO CLOSE GAP | | | DATE TO BE COMPLETED | BI-WEEKLY STATUS | COMPLETED STARTED NA | TARGET MATURITY LEVEL 'APPROPRIATE' TO THE PROCESS | GENERAL NOTES -ALL NEXT LEVEL ATTRIBUTES / BEST PRACTICES -ALL PROCESS MATURITY STEPS | WHO IS RESPONSIBLE FOR PROCESS - USE AND MANAGEMENT |
| P&S NAME | PROCESS NAME | | i.e. PROCEDURE PROCESS FLOW | | | 4/24/2008 | | | | | TEAM MEMBER |

| Threat | Process Control | Coverage Type | Coverage | Metrics - Risk | Behavior | Current Level | Gap | Target Level | Risk | Risk Decision | Risk Sign-off Approval | Funded |
|---|---|---|---|---|---|---|---|---|---|---|---|---|
| INSIDER THREAT — TARGET SPAN OF CONTROL: ALL KNOWN THREAT VECTORS / CURRENT SPAN OF CONTROL / GAP | AP (UNENCRYPTED) | DETECTIVE | 90% | # OF NPI VIOLATIONS | # OF REPEAT OFFENDERS | DEFINED | NO GAP | DEFINED | DEFECTS WILL NOT BE AUTOMATICALLY DETECTED | ACCEPT | USER 1 | N/A |
| | ANTI-VIRUS | DETECT & PREVENT | 95% | # OF QUARANTINED INFECTIONS | # OF USERS WITH HIGH INFECTION RATE | DEFINED | NO GAP | DEFINED | DEFECTS WILL NOT BE AUTOMATICALLY DETECTED | ACCEPT | USER 2 | N/A |
| | PROXY BLOCK | PREVENTATIVE | 95% | # OF SITES BLOCKED WITH DATA LOSS VECTOR | NO | INITIAL | TECHNOLOGY DOES NOT HAVE GRANULAR REPORTING | REPEATABLE | NO ONGOING TEST TO DETERMINE BLOCKS CONTINUALLY STAY IN PLACE | TRANSFER | USER 3 USER 1 | NO |
| | AP (ENCRYPTED) | | NO | NO | NO | NON-EXISTENT | NEED INITIAL DETECTION ON ENCRYPTED CHANNELS | INITIAL | NO DETECTION OF LOSS OF DATA OVER ENCRYPTED CHANNELS | MITIGATE | USER 1 | YES |

ElMcari Control Automation Tool

MOST UTILIZED LINKS: HOME | CONTROLS | METRICS | REPORTS | CORPORATE DIRECTORY SEARCH: [FIRST NAME] [LAST NAME] [GO]    LOGGED IN AS: -USER 1 | LOGOUT

— 1810    CONTROLS MANAGEMENT [REPEATABLE] ▼

CONTROL MASTER RECORD | CONTROL THREAT MAPPING | CONTROL MATURITY LEVEL | CONTROL MATURITY VERIFICATION CHECKLIST | CONTROL ACTION PLAN

| THREAT MAPPED | THREAT NAME | THREAT SCORE | PROBABILITY | IMPACT |
|---|---|---|---|---|
| Y ▼ | INSIDER THREAT | 81 | HIGH | HIGH |
| Y ▼ | UNINTENTIONAL ERROR | 81 | HIGH | HIGH |
| Y ▼ | SOCIAL ENGINEERING | 27 | HIGH | MEDIUM |
| N ▼ | MALWARE | - | HIGH | MEDIUM |
| N ▼ | BOTNET/DDOS | - | MEDIUM | MEDIUM |
| N ▼ | FRAUD | - | MEDIUM | MEDIUM |
| N ▼ | PHISHING | - | MEDIUM | MEDIUM |
| Y ▼ | UNAUTHORIZED ACCESS | 3 | MEDIUM | LOW |
| N ▼ | ZERO-DAY | - | LOW | LOW |
| N ▼ | MAN-IN-THE-MIDDLE | - | LOW | LOW |

VIEW THREAT DEFINITIONS

TOTAL THREAT SCORE    192

*THREAT LIST LAST UPDATED BY ADMIN ON: 09/30/2009

[UPDATE]

*THREAT MAPPING LAST UPDATE BY PERSON 1 09/29/2009

| ElMerit Control Automation Tool | | | | |
|---|---|---|---|---|
| MOST UTILIZED LINKS :: HOME \| CONTROLS \| METRICS \| REPORTS \|CORPORATE DIRECTORY SEARCH: FIRST NAME [ ] LAST NAME [ ] GO | | | | LOGGED IN AS :: USER 1 LOGOUT |
| CONTROL MASTER RECORD \| CONTROL THREAT MAPPING \| CONTROL MATURITY LEVEL \| CONTROL MATURITY VERIFICATION CHECKLIST \| CONTROL ACTION PLAN | | | | |

CONTROLS MANAGEMENT [REPEATABLE] — 1812

NOTE: CHECKLIST DEFAULTS TO CRITERIA MET AS "N/A". SELECT YES IF THE TASK AND TEMPLATE ARE COMPLETED. SELECT NO WHEN THE TASK NEEDS TO BE DONE TO REACH THE NEXT LEVEL OF MATURITY.

VALIDATION AND VERIFICATION CHECKLIST

| | NEXT LEVEL OF MATURITY | NEXT LEVEL MATURITY CRITERIA (MANDATORY) | DESCRIPTION OF NEXT LEVEL MATURITY CRITERIA | CRITERIA MET (YES/NO) | COMMENTS/EVIDENCE (IF CRITERIA MET) | BEST PRACTICES (BEST PRACTICES WILL BE ADDED AS — 1814 PROCESSES MATURE) |
|---|---|---|---|---|---|---|
| INITIAL TO REPEATABLE | MATURITY LEVEL DEFINITIONS | IR1 - DOCUMENTED PROCESSES AND PROCEDURES | ENSURE THAT PROCESSES AND PROCEDURES ARE DOCUMENTED TO SUPPORT THE CONTROLS. | N/A ▼ | | PROCESS TEMPLATE |
| | | IR2 - INITIAL METRICS DEFINED | DEFINE HIGH LEVEL METRICS THAT SUPPORT THE CONTROLS AND PROCESSES. | N/A ▼ | | EXAMPLE: DEFINE COVERAGE AND RISK METRIC |
| | INITIAL PROCESSES ARE AD HOC AND DISORGANIZED (THERE IS EVIDENCE THAT THE ORGANIZATION HAS RECOGNIZED THAT THE ISSUES EXIST AND NEED TO BE ADDRESSED. HOWEVER, THERE ARE NO STANDARDIZED PROCESSES; THERE ARE ad hoc APPROACHES THAT TEND TO BE APPLIED ON AN INDIVIDUAL OR CASE-BY-CASE BASIS. THE OVERALL APPROACH TO MANAGEMENT IS DISORGANIZED). | IR3 - PROCESSES IN ARIS  1813 | CREATE PROCESS MAPS AND STORE IN ARIS. | N/A ▼ | | ARIS |

ElMcart Control Automation Tool

MOST UTILIZED LINKS: HOME | CONTROLS | METRICS | REPORTS | CORPORATE DIRECTORY SEARCH: FIRST NAME | LAST NAME | GO     LOGGED IN AS: USER 1 | LOGOUT

CONTROLS MANAGEMENT
1827 — VULNERABILITY MANAGEMENT CONTROLS DEFINED WITH TARGET MATURITY

| METRIC MASTER RECORD | METRIC THRESHOLD | METRIC VALUES | METRIC ESCALATION | METRIC ACTION PLAN |

METRIC DESCRIPTION: VULNERABILITY MANAGEMENT CONTROLS DEFINED WITH TARGET MATURITY     EMERGING METRIC: NO

METRIC VALUE AND THRESHOLDS

| GREEN | YELLOW | RED |
|---|---|---|
| GREEN > | 0.95 | IN BETWEEN | 0.9 | RED < | 0.9 |

RATIONALE
COUNT OF CONTROLS WITH TARGET MATURITY DEFINED / TOTAL CONTROLS

SCHEDULE DESCRIPTION
PROCESS MATURITY

THRESHOLD SCHEDULE: -SELECT ONE-

[UPDATE]

| ElMcat Control Automation Tool | | | | | LOGGED IN AS:: USER 1 | LOGOUT |
|---|---|---|---|---|---|---|
| MOST UTILIZED LINKS:: HOME | CONTROLS | METRICS | REPORTS | CORPORATE DIRECTORY SEARCH: | FIRST NAME | LAST NAME | GO |

CONTROLS MANAGEMENT
VULNERABILITY MANAGEMENT CONTROLS DEFINED WITH TARGET MATURITY

| METRIC MASTER RECORD | METRIC THRESHOLD | METRIC VALUES | METRIC ESCALATION | METRIC ACTION PLAN |

METRIC NAME: VULNERABILITY MANAGEMENT CONTROLS DEFINED WITH TARGET MATURITY
METRICS VALUE:
DESCRIPTION*:
METRICS VALUE*: (PERCENTAGE)   [UPDATE]
METRIC ENTRY DATE*:

COVERAGE
| SELECT | REGION |
|---|---|
| ☐ | COMPANY 1 |
| ☐ | COMPANY 2 |
| ☐ | COMPANY 3 |
| ☐ | REGION 1 |
| ☐ | REGION 2 |
| ☐ | REGION 3 |
| ☐ | XXX - XX CONTINUUM |
| ☐ | OTHER |

POPULATION BEING MEASURED

HISTORY
| METRIC VALUE | DATE ENTERED | POPULATION TOTAL | DESCRIPTION | DETAILS |
|---|---|---|---|---|
| 1.00000 | 2009-10-20 | 51 | CONTROLS WITH TARGET MATURITY | VIEW |
| 1.00000 | 2009-10-20 | | CONTROLS WITH TARGET MATURITY | |
| 100.00000 | 2009-08-05 | 357 | CONTROLS WITH TARGET MATURITY | VIEW |

EIMcat Control Automation Tool  LOGGED IN AS :: USER 1 | LOGOUT
MOST UTILIZED LINKS :: HOME | CONTROLS | METRICS | REPORTS | CORPORATE DIRECTORY SEARCH: FIRST NAME | LAST NAME | GO 1840 → PLEASE SELECT A REPORT: ENTERPRISE INFORMATION MANAGEMENT - ASSESSMENT SCHEDULE ▷ VIEW REPORT

PRINT REPORT

ENTERPRISE INFORMATION MANAGEMENT - ASSESSMENT SCHEDULE

| CONTROL | OWNER | FUNCTION | INITIAL ASSESSMENT | CURRENT ASSESSMENT | TARGET MATURITY | ACTION PLAN STATUS/DUE DATE | NEXT ASSESSMENT DATE |
|---|---|---|---|---|---|---|---|
| SUPPLIER TESTING | OWNER 1 | SUPPLIER RESILIENCY | N/A | REPEATABLE 2008-09-28 | MANAGED | N/A | 2009-11-09 |
| THOR DATA/PROCESS QUALITY SCORECARD | | INFORMATION EXCHANGE | N/A | INITIAL 2008-09-28 | REPEATABLE | N/A | 2009-11-09 |
| ENTERPRISE RESILIENCY GOVERNANCE | OWNER 2 | BUSINESS CONTINUITY | N/A | REPEATABLE 2008-09-28 | MANAGED | N/A | 2009-12-02 |
| DATA MANAGEMENT | OWNER 3 | "W" OPERATIONS | N/A | INITIAL 2009-09-28 | REPEATABLE | N/A | 2009-12-18 |
| MONTHLY RISK REPORTING | OWNER 4 | Z-UAT-TRAINING | N/A | EMERGING NEW 2008-12-23 | EMERGING NEW | IN PROGRESS N/A | 2009-12-22 |
| INFORMATION SECURITY CONTROLS ASSESSMENTS | OWNER 5 | Z-UAT-TRAINING | N/A | EMERGING NEW 2009-11-18 | MANAGED | NOT STARTED N/A | 2010-01-18 |
| SECURITY EVENT MANAGEMENT | OWNER 6 | CONTROL CENTER MONITORING | N/A | INITIAL 2009-03-08 | MANAGED | N/A | 2010-03-08 |
| CHANGE CONTROL NAME TEST - TESTING | OWNER 7 | Z-UAT-TRAINING | N/A | INITIAL 2008-12-17 | MANAGED | COMPLETE N/A | 2010-05-26 |

FIG. 18K

CONTROL AUTOMATION TOOL

CROSS-REFERENCE TO RELATED APPLICATION

This application is a continuation-in-part of co-pending patent application Ser. No. 12/260,422, filed Oct. 29, 2008 and titled "Control Transparency Framework," the entire disclosure of which is incorporated herein by reference.

BACKGROUND OF THE INVENTION

Organizations are facing increasing risks and threats from various causes, including, for example, fraud, unauthorized access to systems, and insider threats. Current organizational attempts to identify and eliminate these risks/threats are ineffective and/or are difficult to understand and implement. There is no current way to document, communicate and implement how controls are managed across the organization and manage controls and their associated metrics efficiently and effectively.

Thus, there is a need for a transparent (i.e. easy to understand) and actionable risk/reward approach for organizational processes, controls, training and development and a tool for managing the interaction among various organizational areas, resources and data stores for efficient and effective control and metric creation, definition, implementation, management, and evaluation.

BRIEF SUMMARY

A control automation tool ("CAT") is configured for supporting discrete management of controls and their corresponding metrics. The control automation tool includes a software application connected with, stored on, and executed by one or more relational, closed-loop data repositories and computer systems. The use and maturation of a control within an organization depends on management of operational performance and expenses, which the CAT assists through lean project management, effective implementation of action plans and financial functions. Further, people resources, organizational hierarchy and access management functions are used to support mapping of controls arranged by organizational unit and support access permissions that are consistent with appropriate data management. The CAT also provides transparency and meaning to control and metric status and relevant data regarding controls and their associated metrics and is configured for ease of control and metric management via the CAT interface.

The invention embodiments include control automation methods, computer program products, control automation systems, and apparatuses.

In accordance with one embodiment of the invention a control automation method assists an organization comprising one or more users with managing one or more controls and one or more metrics corresponding to the one or more controls. The control automation method includes receiving and storing a plurality of parameters defining the one or more controls, receiving and storing a plurality of parameters defining the one or more metrics, receiving user input choosing one or more of the metrics, mapping, using a processor, the metrics chosen by the user to the one or more controls, receiving and storing one or more metric values corresponding to the one or more metrics, and providing information corresponding to the one or more metric values to the user for assisting the user in determining an effectiveness of the one or more controls. In some embodiments, the method includes receiving user input choosing one or more risk and threat profiles from a risk and threat master profile database, and the one or more risk and threat profiles include information regarding managing one or more risks and threats. In these embodiments, the method also includes mapping, using a processor, the chosen risk and threat profiles to the one or more controls such that the one or more risks and threats are mitigated by implementation of the one or more controls.

In other embodiments, the method includes determining, using a processor, a target maturity state for one or more of the controls based at least in part on the risks and threats mapped to the one or more controls. In yet other embodiments, the method includes receiving and storing information from the user corresponding to one or more control maturity verification checklist criteria, identifying, using a processor, one or more gaps requiring attention, based at least in part on the information received from the user corresponding to one or more control maturity verification checklist criteria, in order for one or more of the controls to attain a target maturity state, and developing, using a processor, one or more action plans comprising one or more action plan steps, the one or more action plans created to assist in closing the one or more identified gaps.

In other embodiments, the method includes determining, using a processor, the effectiveness of the one or more controls based at least in part on the one or more metric values. In these embodiments, the information provided to the user for assisting the user in determining the effectiveness of the one or more controls comprises the effectiveness determined using the processor. In other embodiments, the step of identifying one or more gaps requiring attention includes retrieving, using a processor, one or more gap profiles from an operational and regulatory gap profile repository and comparing, using a processor, the one or more gap profiles with a potential gap to determine whether the potential gap is a gap requiring attention.

In yet other embodiments, the step of identifying one or more gaps requiring attention includes retrieving, using a processor, one or more gap profiles from an operational and regulatory gap profile repository and the step of identifying the one or more gaps requiring attention includes comparing, using a processor, the one or more gap profiles with a potential gap to determine whether the potential gap is a gap requiring attention. In other embodiments, the method includes providing the user a people repository comprising information corresponding to the people within the organization. In some embodiments, the method includes receiving user input choosing one or more people from the people repository and user input choosing one or more preferences corresponding to the one or more chosen people and mapping, using a processor, the people chosen by the user to one or more of the controls based at least in part on the one or more chosen preferences.

In other embodiments, the method includes retrieving, using a processor, policy information from a policy repository, the policy information corresponding to one or more organization policies and standards; and modifying, using a processor, one or more parameters of the control and metrics such that the parameters are aligned with the policy information. In other embodiments, the method includes retrieving, using a processor, business functional classification information from a business and operational functions repository; and grouping, using a processor, based at least in part on the business functional classification information, some or all of the controls and metrics. In yet other embodiments, the method includes retrieving, using a processor, information regarding at least one of budgetary funding allocations, people allocations, and action plans from a projects and business case financials repository and modifying, using a processor, one or more parameters of the control and metrics such that the parameters are aligned with the information.

In accordance with another embodiment of the invention, a computer program product is configured for assisting an organization comprising one or more users with managing one or more controls and one or more metrics corresponding to the one or more controls. The computer program product includes a non-transitory computer-readable medium including computer-readable instructions including instructions for receiving and storing a plurality of parameters defining the one or more controls, instructions for receiving and storing a plurality of parameters defining the one or more metrics, instructions for receiving user input choosing one or more of the metrics, instructions for mapping, using a processor, the metrics chosen by the user to the one or more controls, instructions for receiving and storing one or more metric values corresponding to the one or more metrics, and instructions for providing information corresponding to the one or more metric values to the user for assisting the user in determining an effectiveness of the one or more controls.

In accordance with another embodiment of the invention, a control automation system is configured for assisting an organization comprising one or more users with managing one or more controls and one or more metrics corresponding to the one or more controls. The control automation system includes a workstation module configured for providing access to the control automation system for the one or more users and providing an interface enabling the one or more users to interact with the control automation system, a control management module configured for communicating with the workstation module, a metric repository configured for communicating with the control management module and configured for receiving and storing a plurality of parameters defining the one or more metrics, and a control repository configured for communicating with the control management module. The control repository includes a control profile and process module configured for receiving user input regarding a plurality of parameters defining the one or more controls from the workstation module by way of the control management module, receiving user input choosing one or more of the metrics from the workstation module by way of the control management module, mapping the metrics chosen by the user to the one or more controls, receiving user input regarding one or more metric values corresponding to the one or more metrics from the workstation module by way of the control management module, and communicating information corresponding to the one or more metric values to the user by way of the control management module and the workstation module. The information being for assisting the user in determining an effectiveness of the one or more controls.

In other embodiments, the control automation system includes a risk and threat master profile module configured for storing a plurality of risk and threat profiles, and the control repository also includes a risk profile module configured for receiving user input choosing one or more risk and threat profiles from the risk and threat master profile module from the workstation module by way of the control management module, and the control profile and process module is also configured for mapping the chosen risk and threat profiles to the one or more controls such that the one or more risks and threats are mitigated by implementation of the one or more controls. In some embodiments, the control repository also includes a maturity assessment module configured for determining a target maturity state for one or more of the controls based at least in part on the risks and threats mapped to the one or more controls. In some embodiments, the maturity assessment module is also configured for receiving, from the workstation module by way of the control management module, information from the user corresponding to one or more control maturity verification checklist criteria, and the control repository also includes a gap profiles module configured for identifying one or more gaps requiring attention, based at least in part on the information received from the user corresponding to one or more control maturity verification checklist criteria, in order for one or more controls to attain a target maturity state and an action plan module configured for developing one or more action plans comprising one or more action plan steps, the one or more action plans created to assist in closing the one or more identified gaps.

In yet other embodiments, the control management module of the control automation system includes is further configured for determining the effectiveness of the one or more controls based at least in part on the one or more metric values, and the information provided to the user for assisting the user in determining the effectiveness of the one or more controls includes the effectiveness determined by the control management module. In some embodiments, the gap profile module is further configured for retrieving one or more gap profiles and comparing the one or more gap profiles with a potential gap to determine whether the potential gap is a gap requiring attention. In other embodiments, the control automation system includes a people resources module configured for communicating with the control management module and providing the user a people repository comprising information corresponding to the people within the organization.

In some embodiments, the control repository is further configured for receiving user input from the workstation module by way of the control management module, the user input including choosing one or more people from the people repository and choosing one or more preferences corresponding to the one or more chosen people and mapping the people chosen by the user to one or more of the controls based at least in part on the one or more chosen preferences. In some embodiments, the control automation system includes a policy and standards module, and wherein the control management module is further configured for retrieving policy information from the policy and standards module, the policy information corresponding to one or more organization policies and standards. In these embodiments, the control repository is further configured for modifying one or more parameters of the controls such that the parameters are aligned with the policy information. In yet other embodiments, the control automation system includes a policy and standards module, and the control management module is further configured for retrieving policy information from the policy and standards module, the policy information corresponding to one or more organization policies and standards. In these embodiments, the metric repository is further configured for modifying one or more parameters of the metrics such that the parameters are aligned with the policy information.

In yet other embodiments, the control automation system includes a business and operational functions module, and the control management module is further configured for retrieving business functional classification information from the business and operational functions module grouping, using a processor, based at least in part on the business functional classification information, some or all of the controls and metrics.

In yet other embodiments, the control automation system includes a projects and business case financials module, and the control management module is further configured for retrieving information regarding at least one of budgetary funding allocations, people allocations, and action plans from the projects and business case financials module and modifying one or more parameters of the controls and metrics such that the parameters are aligned with the information.

In accordance with another embodiment of the invention, an apparatus assists an organization comprising one or more users with managing one or more controls and managing one or more metrics corresponding to the one or more controls. The apparatus includes means for receiving and storing a plurality of parameters defining the one or more controls, means for receiving and storing a plurality of parameters defining the one or more metrics, means for receiving user input choosing one or more of the metrics, means for mapping the metrics chosen by the user to the one or more controls, means for receiving and storing one or more metric values corresponding to the one or more metrics, and means for providing information corresponding to the one or more metric values to the user for assisting the user in determining an effectiveness of the one or more controls.

BRIEF DESCRIPTION OF THE DRAWINGS

Figure 1:
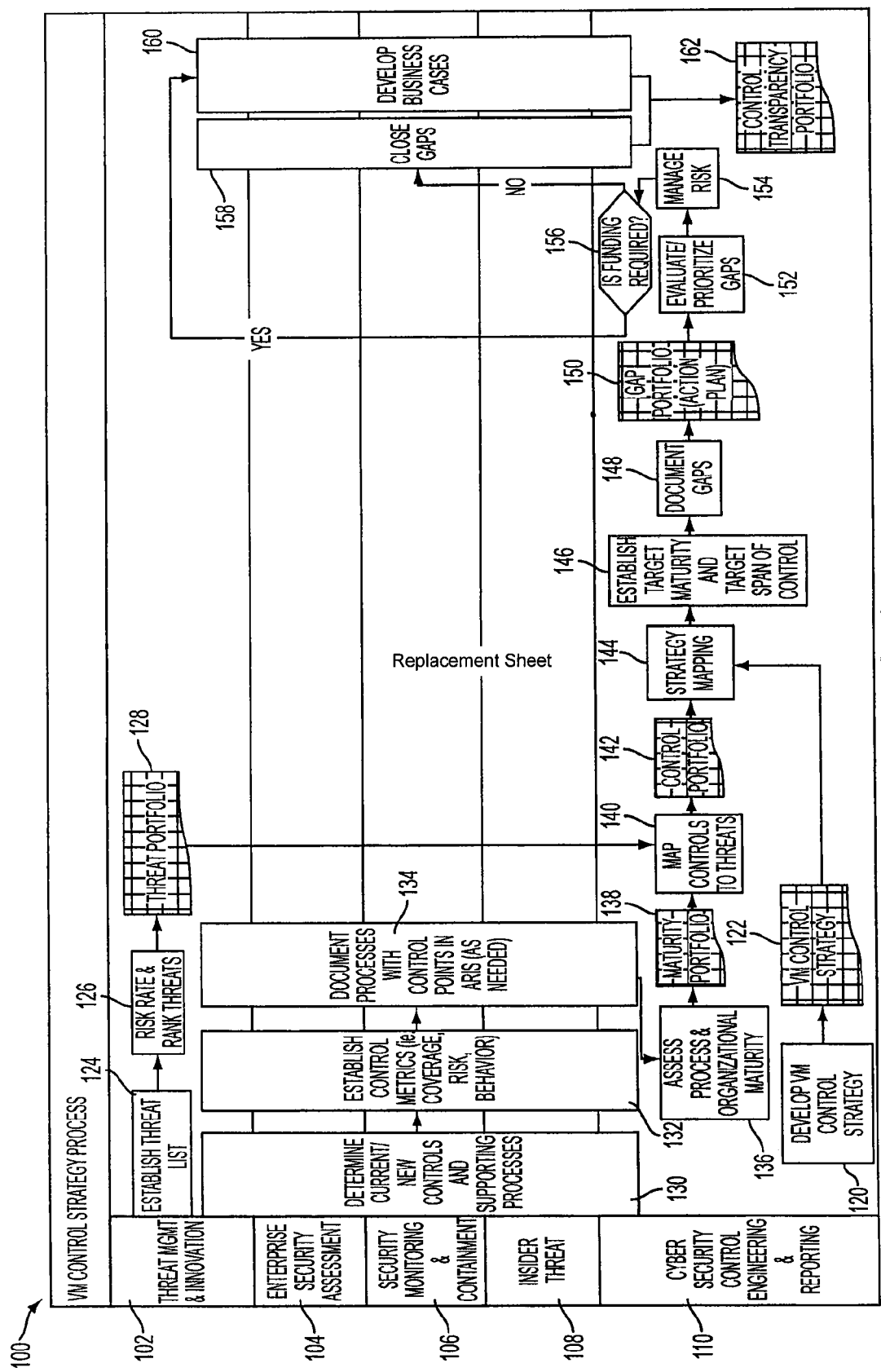

Having thus described embodiments of the invention in general terms, reference will now be made to the accompanying drawings, which are not necessarily drawn to scale, and wherein:

FIG. 1 is a flow chart of an example of a control transparency framework in accordance with an embodiment of the present invention.

FIG. 2A is a chart of an example of a threat list in accordance with an embodiment of the present invention.

FIG. 2B illustrates an example of a threat list including threats, impact score, probability, and risk score in accordance with another embodiment of the present invention.

Figure 2C:
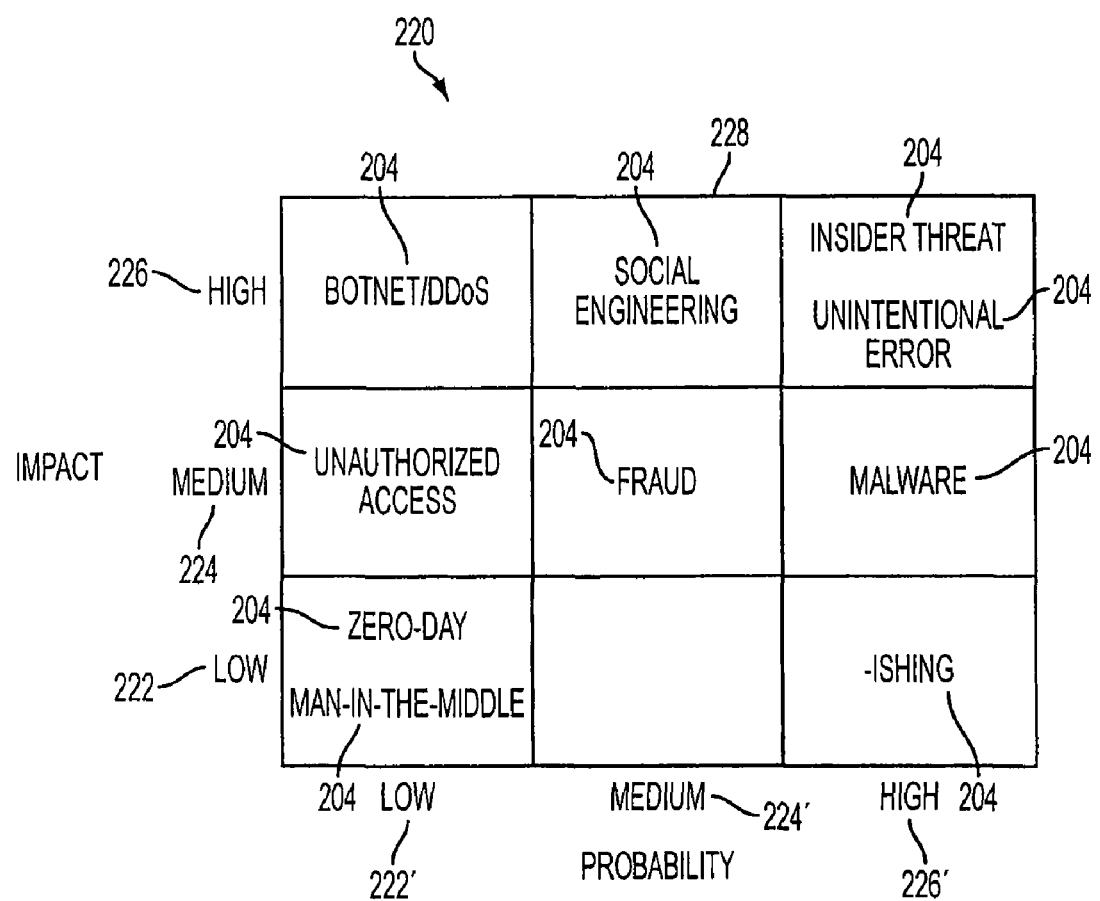

FIG. 2C illustrates an example of a 9-block NIST in accordance with an embodiment of the present invention.

Figures 3A, 3B:
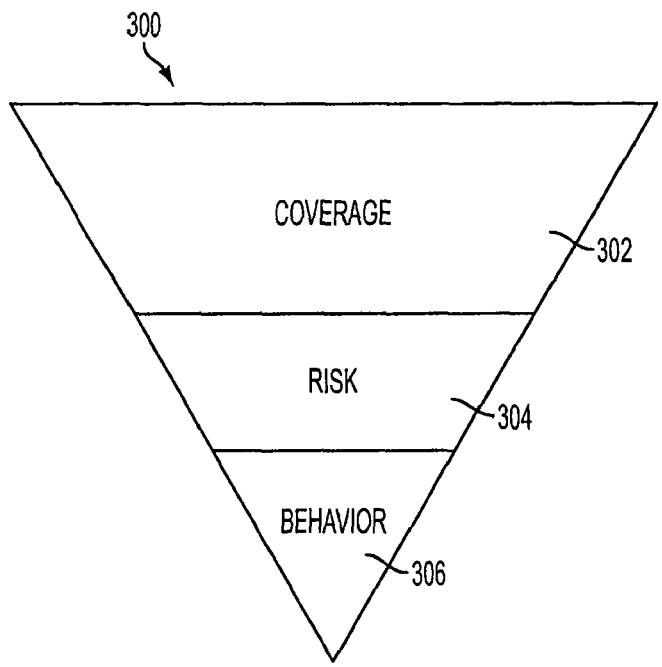

FIG. 3A is an example of a Hoshin triad model in accordance with an embodiment of the present invention.

FIG. 3B illustrates an example of a chart indicating the process/control and the metrics associated therewith in accordance with an embodiment of the present invention.

FIG. 4 illustrates three different views of organizational processes in accordance with an embodiment of the present invention.

FIG. 5A is an example of a maturity portfolio in accordance with an embodiment of the present invention.

FIG. 5B illustrates another example of the maturity portfolio in accordance with another embodiment of the present invention.

Figure 6:
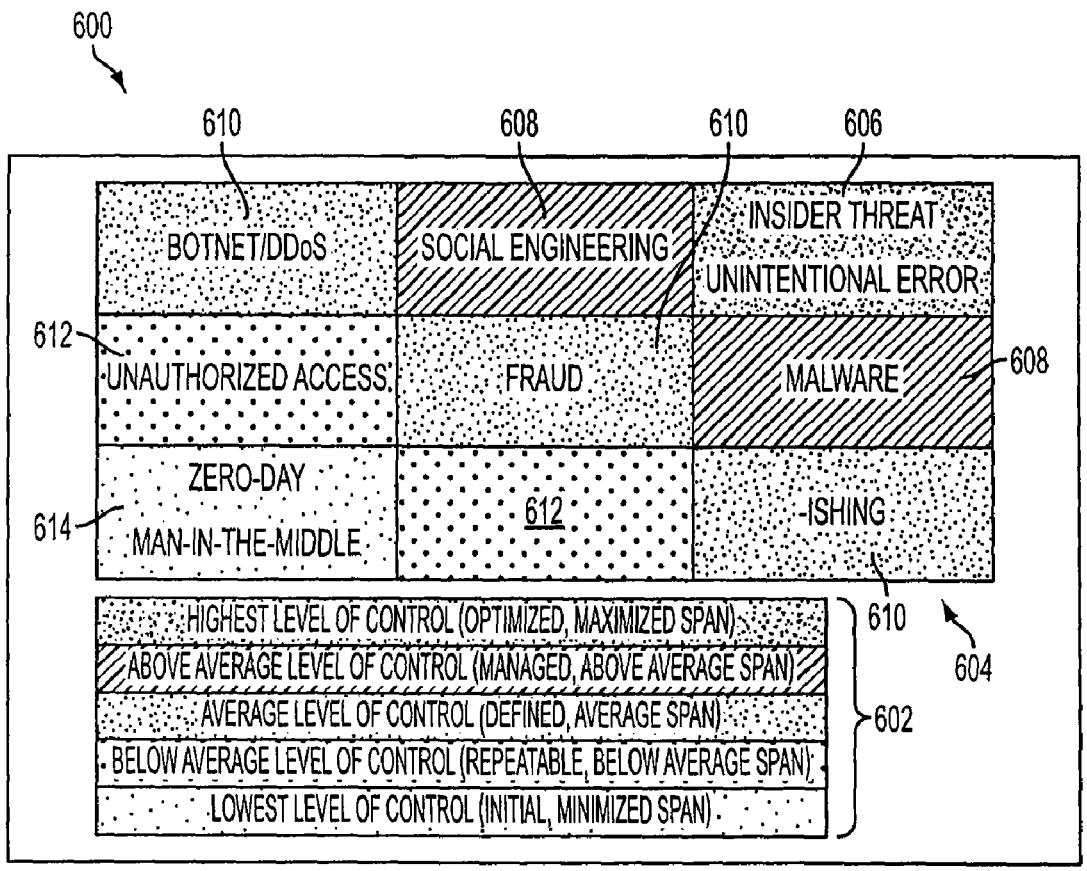

FIG. 6 illustrates an example of a strategy map using the 9-block NIST model in accordance with an embodiment of the present invention.

Figures 7A, 7B:
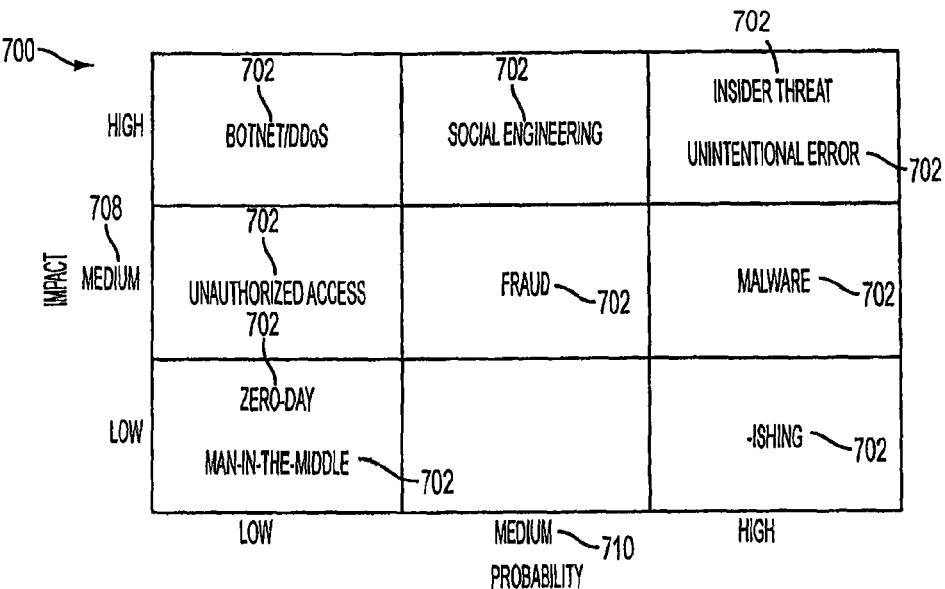

FIG. 7A is another example of the 9-block NIST model in accordance with another embodiment of the present invention.

FIG. 7B illustrates an example of associating a risk score with each threat in accordance with an embodiment of the present invention.

Figure 7C:
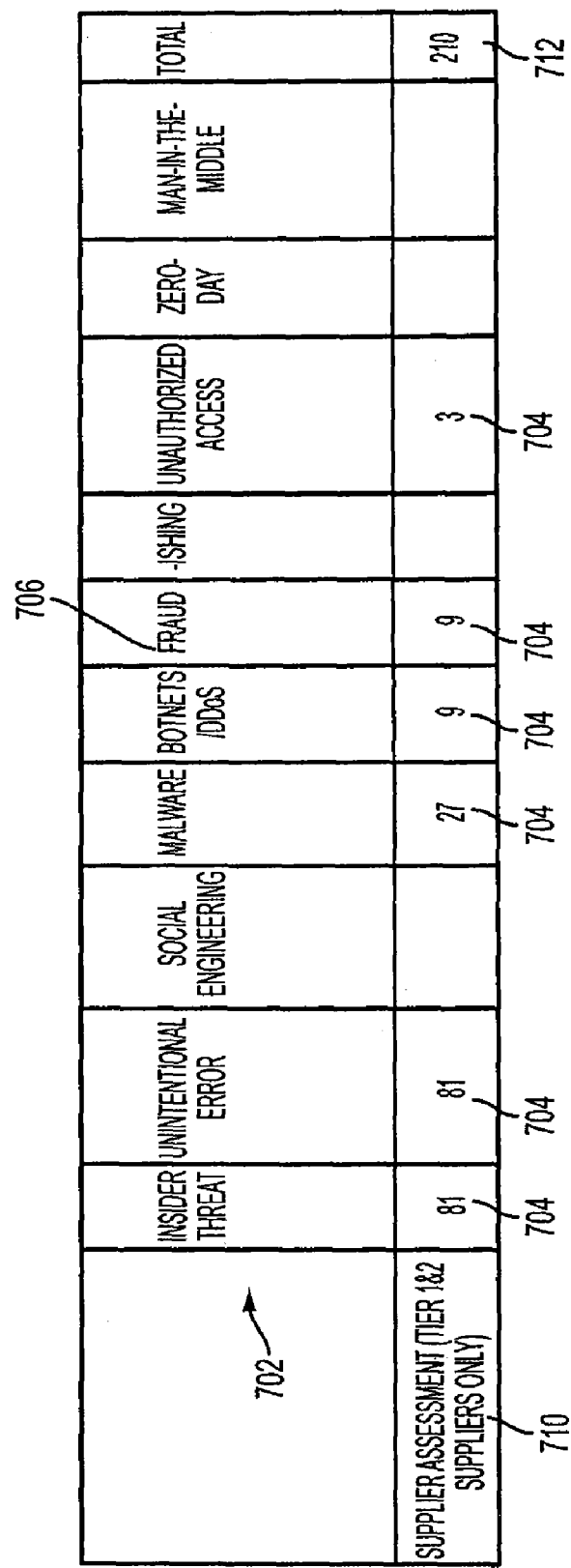

FIG. 7C illustrates another example of associating risk scores with threats and a total risk score in accordance with an embodiment of the present invention.

FIG. 8 illustrates an example of the target span of control in accordance with an embodiment of the present invention.

Figure 9:
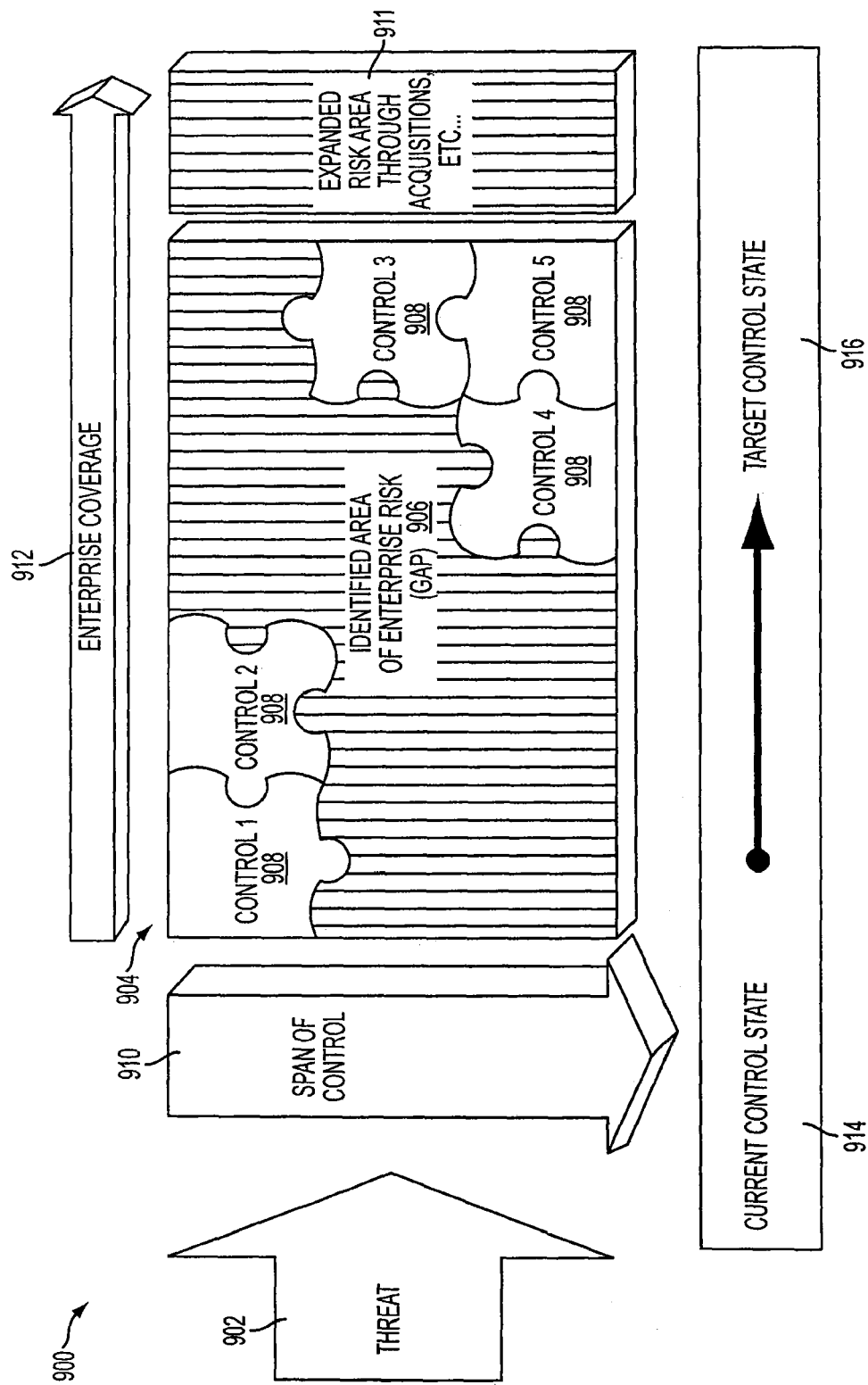

FIG. 9 illustrates an example of the control transparency framework system and a control accelerator in accordance with an embodiment of the present invention.

Figure 10A:
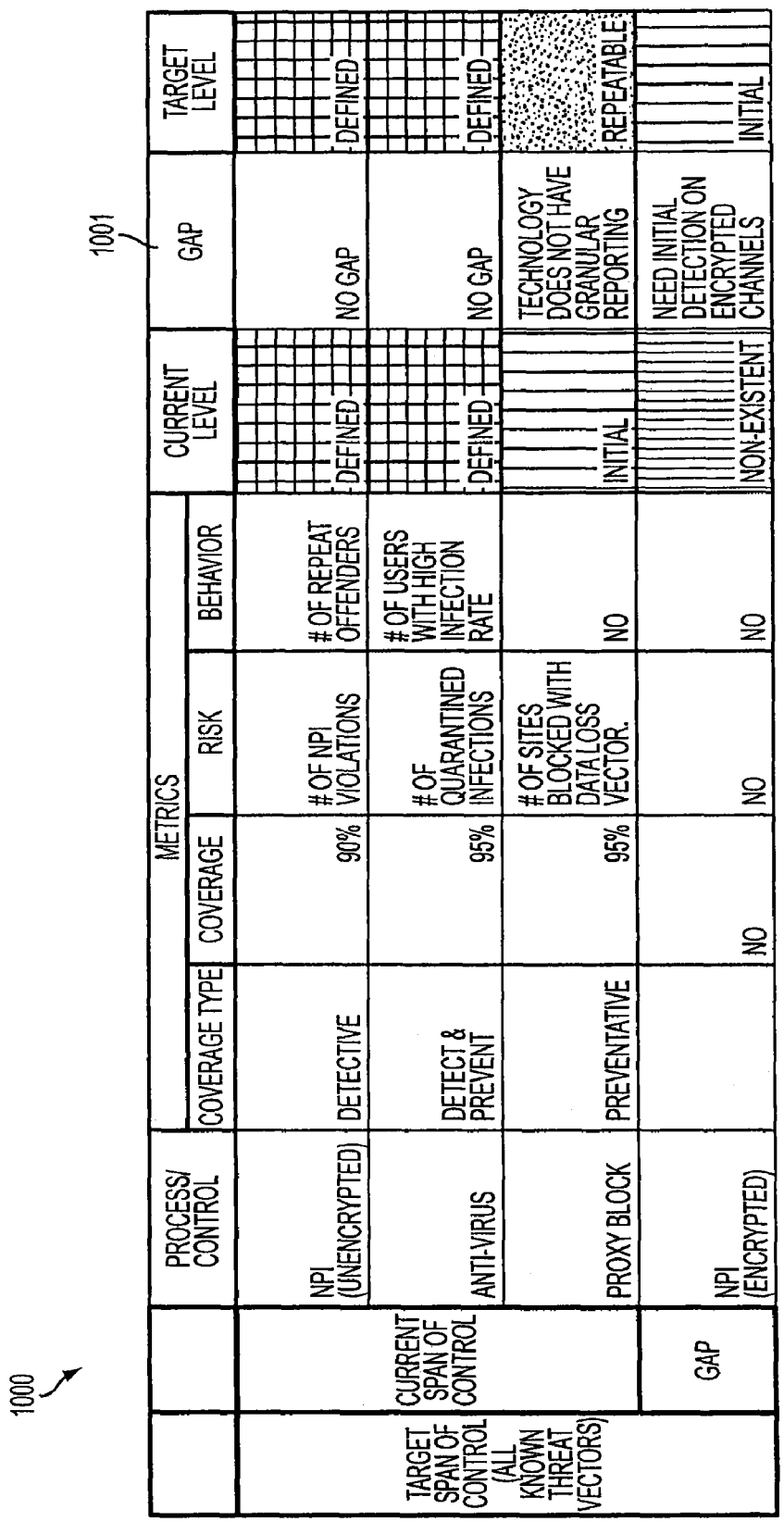

FIG. 10A illustrates an example of a gap portfolio in accordance with an embodiment of the present invention.

FIG. 10B illustrates an example of an action plan in accordance with an embodiment of the present invention.

Figure 11:
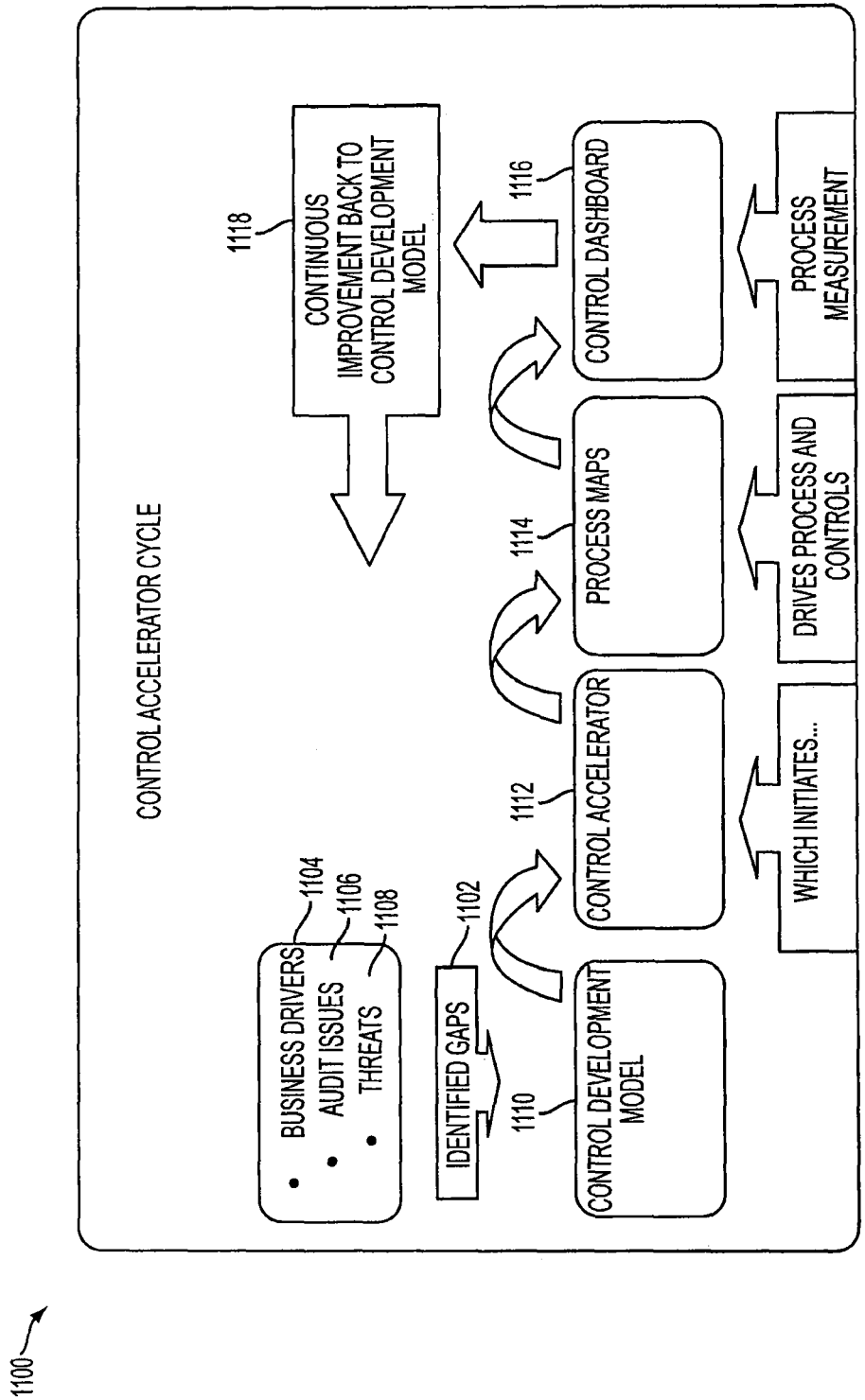

FIG. 11 illustrates an example of a control accelerator cycle and processes of the control transparency framework method in accordance with an embodiment of the present invention.

FIG. 12 illustrates an example of a control transparency portfolio in accordance with an embodiment of the present invention.

Figure 13:
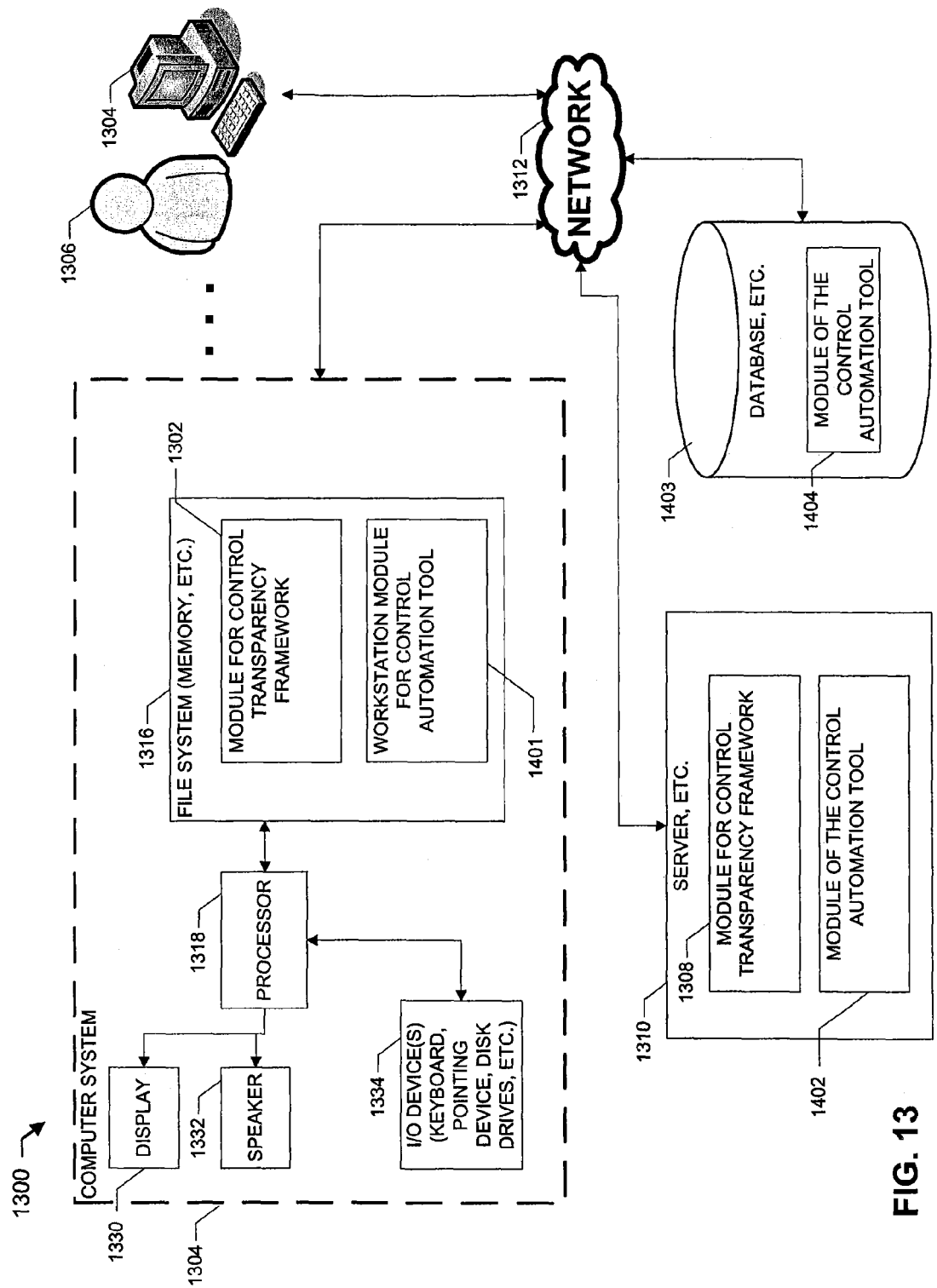

FIG. 13 is a block schematic of an example of a system for the control transparency framework and the control automation tool in accordance with an embodiment of the present invention.

Figure 14:
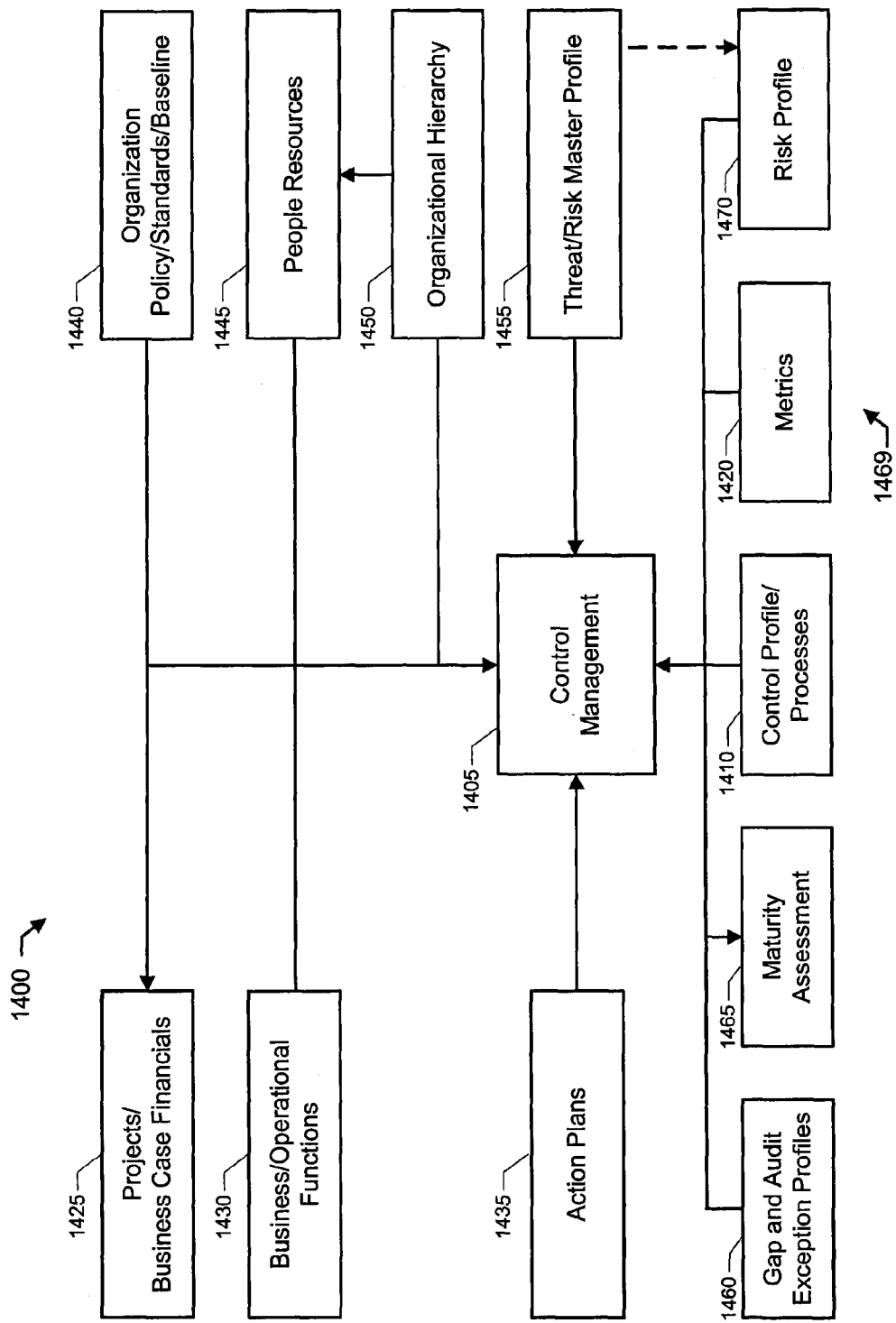

FIG. 14 illustrates a database schema representing one embodiment of the Control Automation Tool.

Figure 15:
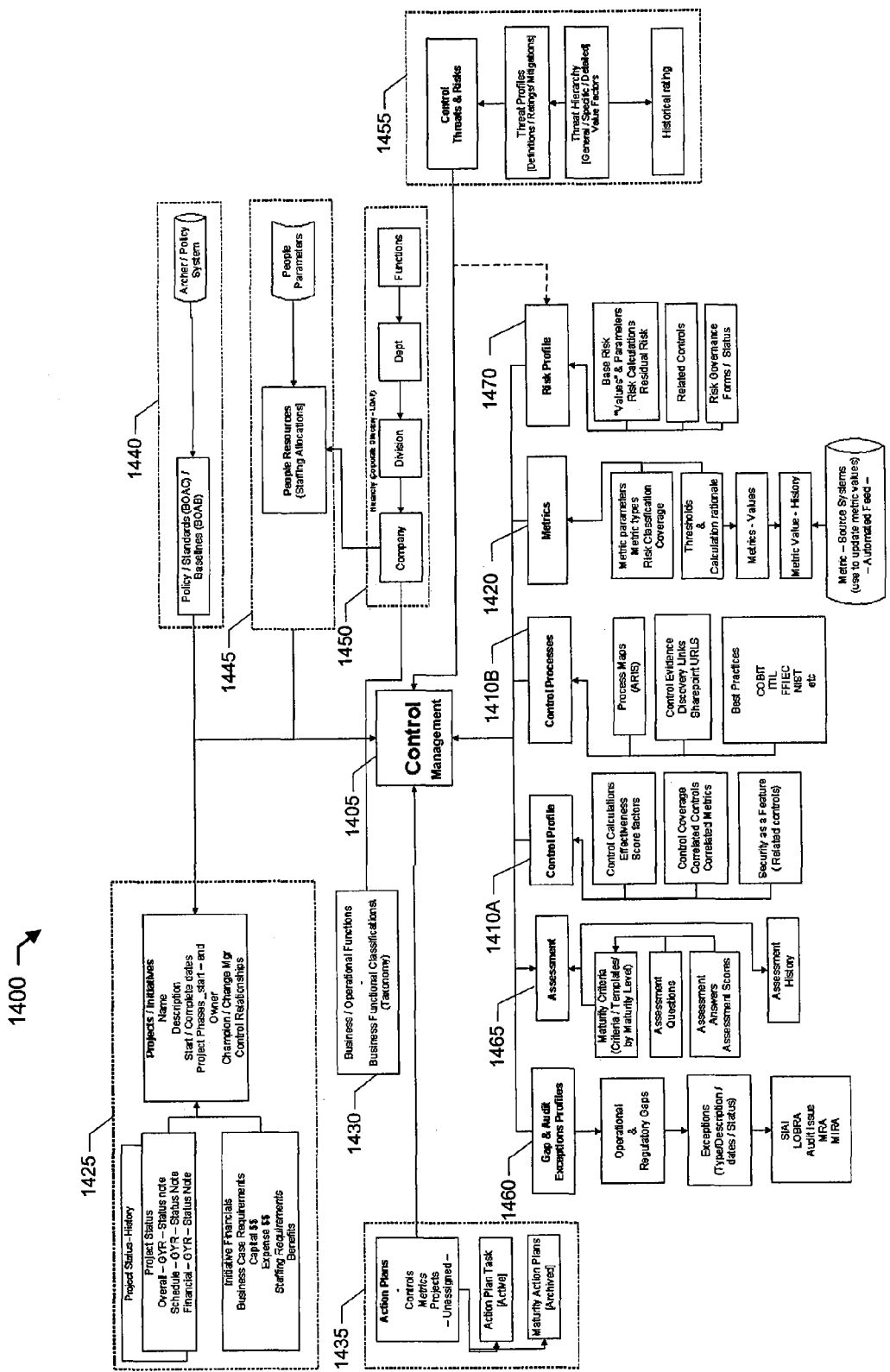

FIG. 15 illustrates a more detailed database schema representing one embodiment of the Control Automation Tool.

Figure 16A:
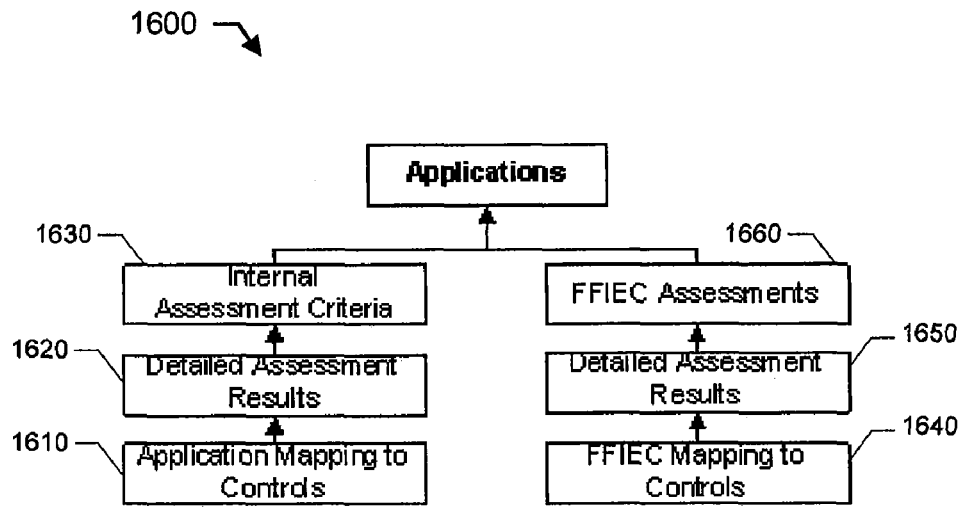
Figure 16B:
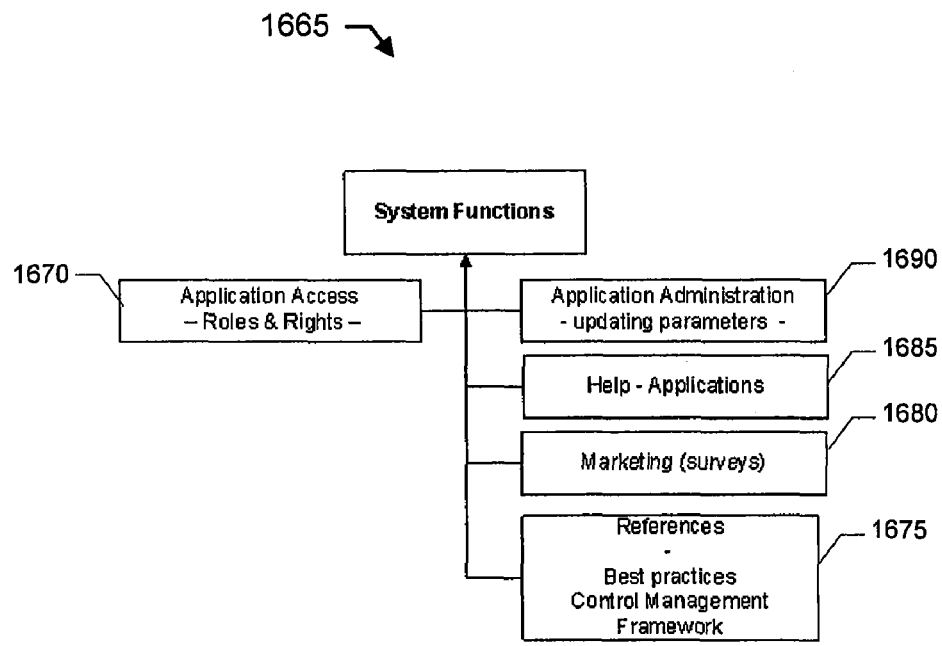

FIGS. 16A and 16B are data flow diagrams regarding Applications and System Functions of the Control Automation Tool.

Figure 17:
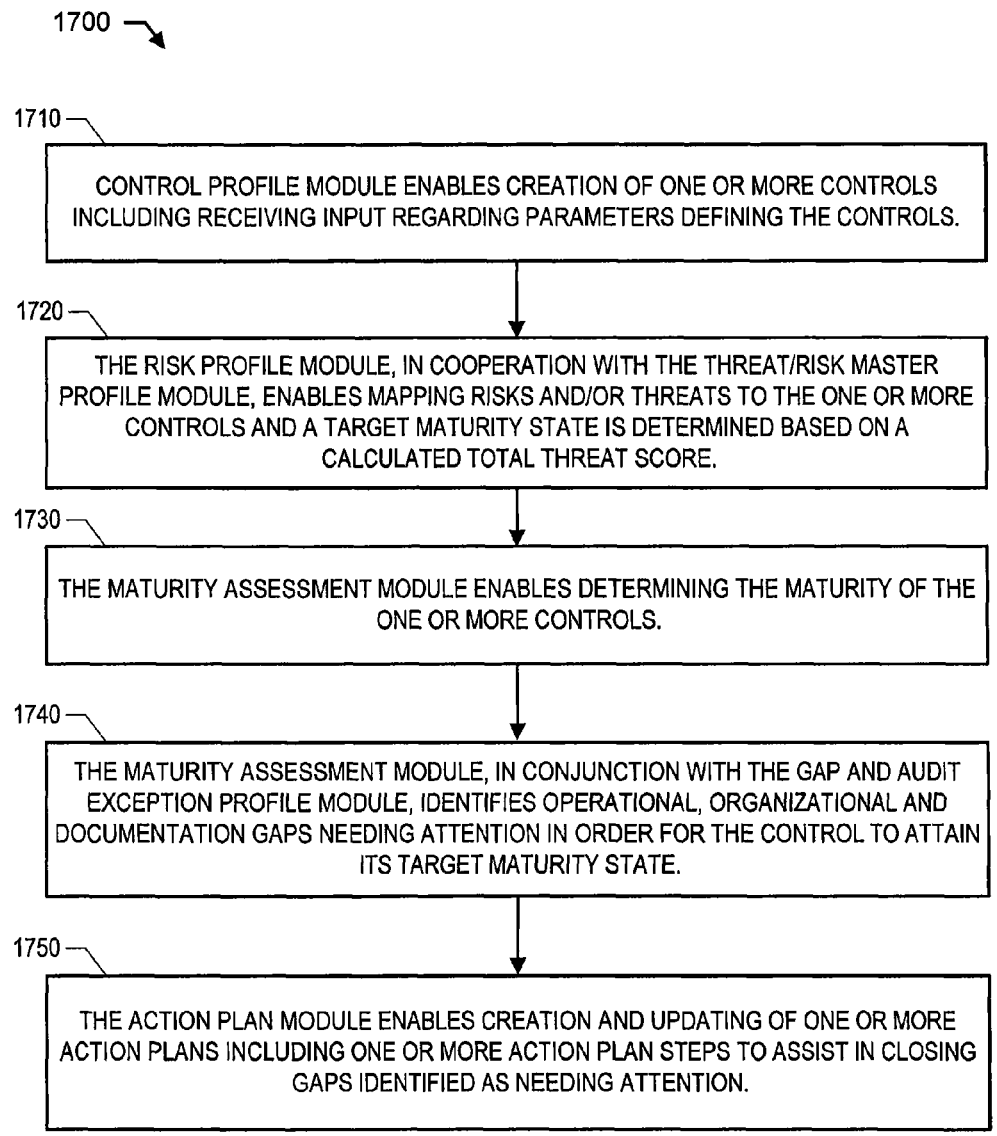

FIG. 17 is a flowchart illustrating a process for defining, managing and assessing one or more controls.

FIGS. 18A-18K are screenshots of one embodiment of the Control Automation Tool interface.

DETAILED DESCRIPTION

The following detailed description refers to the accompanying drawings which illustrate specific embodiments in accordance to the present the invention. Other embodiments having different structures and operations do not depart from the scope of the present invention.

FIG. 1 is a process flow chart illustrating an example of a control transparency framework method 100 in accordance with one embodiment of the present invention. The process flow chart is divided into sections illustrating roles or responsibilities of one or more sectors or groups of an organization, including Threat Management & Innovation 102, Enterprise Security Assessment 104, Security Monitoring & Containment 106, Insider Threat 108, and Cyber Security Control Engineering & Reporting 110. In one embodiment, one or more of the roles or responsibilities shown in FIG. 1 are undertaken by one sector or group, instead of multiple sectors. As shown in FIG. 1, all sectors or groups has the same roles and/or responsibilities, including determining current/new controls and supporting processes 130, establishing control metrics 132, documenting processes, closing gaps and/or developing business cases 134.

In order to demonstrate transparency (i.e. ease of understanding) in the controls, six deliverables are developed, including a threat portfolio 128, maturity portfolio 138, vulnerability management (VM) control strategy 122, control portfolio 142, gap portfolio 150 and control transparency portfolio 162. The activities for developing the threat portfolio 128 are undertaken by the Threat Management and Innovation sector 102. The activities for developing the maturity portfolio 138, vulnerability management (VM) control strategy 122, control portfolio 142, gap portfolio 150 and control transparency portfolio 162 are undertaken by the Cyber Security Control Engineering & Reporting (CSCER) sector 110. Each of the activities and roles/responsibilities are discussed below with reference to FIG. 1 and each of the respective figures.

In block 120, a VM control strategy is developed to establish a common control strategy. The VM control strategy provides a basis for all control decisions as each sector or group moves forward in the future. The VM control strategy not only provides a foundation but also a vision for each organizational sector and group. The strategy describes how controls will be applied throughout the organization, the priority the organization assigns to each identified risk, and what level of controls will be assigned to which risks. For example, the VM control strategy may indicate that a high risk threat will be controlled by a highly mature control. Resulting from the VM control strategy is the VM control strategy deliverable, shown in block 122. This deliverable 122 may be a report, spreadsheet, database, or any other type of strategy or plan.

In block 124, a threat list is established. Because many organizations are threat-based, the foundation of the control framework is also threat based. However, the foundation of the control framework may be based on one or more factors in addition to threat-based factors, such as risk/reward based factors, action plan based factors and other factors related to implementing a plan in an organization. Regardless, the threat portfolio, shown in block 128, provides structure and reason around placement of controls. For assessment purposes, the Threat Management and Innovation sector 102 is responsible for providing an updated threat list periodically after a predetermined time period, such as every financial quarter. An example of the threat list excerpt 200 is shown in FIG. 2A. In the illustrated embodiment of FIG. 2A, the risk category 202 (e.g. physical, technical, people, etc.) and the specific risk/threat 204 (e.g. theft and fraud, man in the middle, botnets, malware, etc.) identify the risk/threat 204.

In block 126, the risks/threats 204 are rated and ranked. As shown in FIG. 2B, to rate and rank the risks/threats 204, an impact score 206 and probability score 208 are first given to each risk/threat 204 on the threat list 210. A risk score 212 is then calculated using a risk formula. For example, the formula (not shown) used for the table of FIG. 2B calculates the risk score 212 by multiplying the impact 206 times the probability 208. The impact 206 refers to how much of an impact the risks/threats 204 may have on the organization. For example, an impact 206 having a value of "5" of the "Theft and Fraud" risk 214 in FIG. 2B indicates that this risk 214 may have a very large negative impact against the organization in the event that the risk 204 becomes reality. The probability factor 208 is directly related to what the probability of the risk/threat 204 actually occurring in the organization. The probability factor 208 may be calculated from facts (e.g. empirical data, historical data, industry data, etc.), chosen by a representative of the organization (e.g. by choosing a risk score, choosing facts to apply to the risk score, surveying multiple parties, etc.), or a combination thereof. The higher the probability score, the more likely the risk/threat 204 will occur. For example, in FIG. 2B, since the "Theft and Fraud" risk 214 has a probability value 208 of "5," this risk 214 is more likely to occur relative to other risks 204 listed in the table of FIG. 2B having probability values 208 of "3", "1", "0", etc. The impact and probability values 206, 208 may be represented in other number formats, such as ratios or percentages.

As illustrated in FIG. 2C, the National Institute of Standards and Technology (NIST) 9-block model 220 is used to map risks/threats 204 that apply to the organization's environment. The NIST model 220 provides a visual representation of impact 206 versus probability 208 with a scale of low 222, medium 224, and high 226. As illustrated, the risks 204 in the upper right hand box 228 (e.g. insider threat and unintentional error) are the highest risks.

Referring back to FIG. 1, in block 128, the threat portfolio deliverable is created once the risks/threats 204 are established, rated and ranked, as previously described with regard to blocks 124 and 126. An example of the threat portfolio is illustrated in FIG. 2B at reference numeral 230. It should be understood that the threat portfolio may take other shapes or forms and may include other information and/or factors than the ones explicitly detailed in FIG. 2B. Regardless, the threat portfolio 230 is used as the foundation of control decisions made within the organization and will be used to establish control priority and focus. The Threat Management and Innovation sector 102 is responsible for creating the threat portfolio 230.

In block 130, current and new controls and supporting processes are determined. All current controls must be identified within each sector and each supporting function, including Threat Management & Innovation 102, Enterprise Security Assessment 104, Security Monitoring & Containment 106, Insider Threat 108, and Cyber Security Control Engineering & Reporting 110. In one embodiment, a control is any administrative, management, technical, or legal method that is used to manage risk. Controls are safeguards or countermeasures and include practices, policies, procedures, programs, techniques, technologies, guidelines, organizational structures and/or other approaches or strategies to manage risk.

In block 132, control metrics are established by all organizational sectors or groups, including Threat Management & Innovation 102, Enterprise Security Assessment 104, Security Monitoring & Containment 106, Insider Threat 108, and Cyber Security Control Engineering & Reporting 110. Each mitigating control includes a set of reporting metrics. Once the control metrics accomplish control transparency and development of a risk profile, the control metrics drive organizational change. The control metrics are established using a Hoshin model which shows what amount or percentage of each control has a defined control target in the control transparency model. The goal of the Hoshin model is to be at 100% so that each target is addressed and controlled. The Hoshin model is met by utilizing the reporting triad model 300 (FIG. 3A) which establishes a coverage 302, risk 304, and behavior profile 306. As shown in the illustrated embodiment of FIG. 3A, the Hoshin triad model 300 includes three layers, including a behavior layer 306, risk layer 304 and coverage layer 302. The behavior layer 306 provides analytics into patterns of risk to drive program change and identifies issues requiring action. The coverage layer 302 provides transparency to service adoption and program penetration and highlights successes and areas requiring attention. The risk layer 304 identifies current sources of the highest risks based on open findings and provides actionable information to direct resources for the highest risks. The Hoshin triad model 300 illustrates that the behavior 306 needing to be controlled is the basis of the chart 300. The behavior layer 306 should be completely covered by the risk layer 304 and the coverage layer 302 should completely cover all risks 304.

FIG. 3B illustrates a chart 310 indicating the process/control 312 and the metrics 314 associated therewith. Specifically, the coverage percentage 316 is shown with relation to each respective process/control 314. For example, with respect to the anti-virus 318, the coverage percentage is 95% (shown at 320). The behavior 322 for the anti-virus risk 318 that is being controlled is the number of users with high computer virus infection rate 324. The risk 326 of this behavior 318 is that there are a number of computers infected with viruses, leading to lower productivity and possibly loss of data or theft of data. The coverage type 328 for the anti-virus risk 326 is to detect and prevent. Although 95% is a good percentage of coverage 316, the goal is to be at 100%.

Once processes 312 are identified and metrics 314 are determined, the processes 312 are then to be documented (both with process map and process document) with appropriate control points in an appropriate repository, as is described below with regard to block 134. If documentation has already been completed, the documentation phase can be skipped and the process will go under review.

Referring to block 134 of FIG. 1, processes of an organization are analyzed and documented with control points by each sector or group, including Threat Management & Innovation 102, Enterprise Security Assessment 104, Security Monitoring & Containment 106, Insider Threat 108, and Cyber Security Control Engineering & Reporting 110. This creates an accurate view of the organizational processes through process modeling, mapping and initial control point identification. Peer reviews from other groups can be beneficial to such process. However, those most intimate with the process should be preferably involved due to being most aware of the potential and current weaknesses in the current environmental state. In order to gain a better understanding of the organization's current processes and controls, the current state of the organization's processes and maturity is documented through process modeling. This type of modeling allows us to accelerate business results by identifying improvement opportunities such as organizational duplication, non-value added activities, areas of re-work, and project/process overlap. The process modeling follows basic process mapping logic and may include breaking down the work and individual tasks, estimating level and duration of effort, calculating resource requirements, assigning responsibilities, and determining deliverables (inputs and outputs).

To begin the process modeling, process maps are first created for all core business processes. Software is used to create these process maps and is used as a central, enterprise repository for the process maps and related process data elements. The software is web browser based and utilizes shapes, data and model types via a graphical user interface (GUI).

While there are a variety of process maps that may be available, the creation of three basic levels of process maps will be sufficient for most organizational sectors, including overall process maps, high-level maps, and mid-level process maps. These process maps are illustrated in the diagram 400 of FIG. 4 and each of which illustrate roles/responsibilities and actions to be taken. The overall process map 402 is a division level map including all related subgroups 401 and gives the reader of the map an overview of the synergy between the division and the subgroups 401, including roles/responsibilities 403 and how they are interconnected between groups of an organization. The high level map 404 is a value chain map that provides the reader with no knowledge of a particular function or process with an idea of how the process works at a very high level. The mid-level model 406 is a detailed process map of overall process flow, process dependencies, vested business partners and control points. As shown in FIG. 4, the process maps 406 are stored in the Process Library 408, which may be a database or other system located on a server or other computer (not shown).

As previously mentioned, in block 134, the control points of the organization are identified. A control point is any point in the process that is designed to provide reasonable assurance regarding the achievement of objectives including the effectiveness and efficiency of operations, reliability of financial reporting, compliance with applicable laws and regulations and safeguarding of assets. A control point should be designed to mitigate risk and provide reasonable assurance that associates, management or other organizational employees will prevent or detect a "failure" from occurring. A "failure" results when a risk is not properly controlled such that a threat becomes reality and the organization is impacted. Control points are necessary to ensure that processes are running efficiently and will serve as a type of "engine warning light" to alert the organization to possible issues. Control points can be actions taken to ensure that what the organization desires to occur will occur in response to predetermined triggers.

In the initial stages of process modeling, current control points are identified to determine what controls points exist. As the methodology progresses, gaps in the controls are determined and identified, as will be discussed later in this disclosure. Objectives of the control points include accomplishing goals and objectives of the organization, achieving reliability and integrity of information, realizing economical and efficient use of resources, and safeguarding of assets. Failure of one or more control points may result in inconsistent objectives, lack of organizational integrity, weak control environment, inability to understand and react to changing conditions, and poor communication.

The control points have various classifications that should be adhered to in order to sufficiently document the control points. For example, one or more control points may be classified as preventative and/or detective. The control points may also be classified as automated or manual. Tiers may also be used to create an additional classification to relate the control points to associated metrics and/or to show their relationship to the overall process. It should be understood that these classifications are not mandatory, but, instead, are merely a consideration in case that an additional metric detail is needed.

In block 136, the organization, such as the Cyber Security Control Engineering & Reporting sector 110, performs two maturity assessments (i.e. process maturity assessment and organizational maturity assessment) as a part of the control transparency framework process 100. These assessments allow an understanding of the level of maturity and capability with each process and organization. First, the process maturity is established based on common criteria across the organization. The organization uses one or more maturity models to determine the processes maturity. A maturity model can be described as a structured collection of elements that describe certain aspects of maturity in an organization. The maturity model may provide, for example, a place to start the assessment, the benefit of prior experiences, a common language and a shared vision, a framework for prioritizing actions, and a way to define what improvement means for your organization. The maturity model can be used as a benchmark for comparison and as an aid to understanding, for example, for comparative assessment of different organizations where there is something in common that can be used as a basis for comparison. In the case of a Capability Maturity Model (CMM), for example, the basis for comparison would be the organization's software development processes.

In one embodiment, a blend of two maturity models is employed, including a Control Objective for Information and related Technology (COBIT) Maturity Model and the Capability Maturity Model (CMM). COBIT is a framework of best practices for IT management. COBIT is the general framework used in the IT industry. The COBIT mission is to research, develop, publicize and promote an authoritative, up-to-date, international set of generally accepted information technology control objectives for day-to-day use by business managers and auditors. There are various advantages to using COBIT. First, COBIT provides best practices for the management of IT processes in a manageable and logical structure. Second, COBIT is an internationally accepted set of guidance materials for IT governance.

COBIT consists of various control objectives over multiple domains. In one embodiment, the domains include: 1) Plan and Organize (PO), 2) Acquire and Implement (AI), 3) Deliver and Support (DS) and 4) Monitor and Evaluate (ME). The PO domain provides direction to solution delivery (AI) and service delivery (DS). The AI domain provides solutions and transfers these solutions so that they may be turned into services. The DS domain receives the solutions and makes them usable for end users. The ME domain monitors all processes to ensure that the direction provided is followed.

Because COBIT is a framework, associations between control points and each respective COBIT control objective should be created by the organization representative or other persons. When mapping to the COBIT framework, the COBIT domain is first identified based on the functional description of the control points. Next, the control objectives that most closely match the identified control points are drilled down and the point of correlation is marked. Multiple correlations may exist between a single control point and multiple control objectives.

As previously mentioned, CMM may also be employed in determining the maturity assessments. CMM is a process capability maturity model which aids in the definition and understanding of an organization's processes and the organizational maturity in diverse areas, such as, for example, software engineering, system engineering, project management, software maintenance, risk management, system acquisition, information technology (IT), and personnel management.

Both COBIT and CMM are used to determine the two maturity components—the organization's process maturity and the organizational maturity. The organizational maturity is established through a series of interviews and reviewing a sample of the process documentation. The interviews consist of questions around awareness and communication, processes and procedures, tools and automation, skills and expertise, responsibility and accountability, and goals and metrics. In addition to COBIT and CMM, it should be understood that other maturity models may also be employed, such as EOP or SSE-CMM.

As shown in the illustrated embodiment of FIG. 5A, after current COBIT/CMM maturity levels 502 are established, they are documented in a maturity portfolio, which is described further below with regard to block 138. As illustrated in FIG. 5A, the current maturity level 502 has values associated with each process 504 ranging from "non-existent," "initial," "repeatable," "defined," "managed," and "optimized." "Non-existent" refers to a complete lack of any recognizable processes. For example, for a process 504 to be labeled as "non-existent," the organization has not recognized that there is an issue to be addressed. "Initial" means that there is evidence that the organization has recognized that the issues exist and need to be addressed, but there are no standardized processes that are in place. Instead, there are only ad hoc approaches that tend to be applied on an individual or case-by-case basis. In this stage, the overall approach to management is disorganized. For "repeatable," processes have developed to the stage where similar procedures are followed by different people undertaking the same task. But there is no formal training or communication of any standard procedures, and responsibility is left to the individual such that there is a high degree of reliance on the knowledge of the individual, and therefore, errors are likely to occur. "Defined" refers to procedures that have been standardized, documented, and communicated through training However, the individual is relied upon to follow these processes, and it is unlikely that deviations from these processes will be detected. The procedures themselves are not sophisticated but rather are the formalization of existing practices. For "managed," it is possible to monitor and measure compliance with procedures and action is taken where processes appear not to be working effectively. Processes are under constant improvement and provide good practice. Automation and tools are used in a limited or fragmented way. "Optimized" means that the processes have been refined to a level of best practice, based on the results of continuous improvement and maturity modeling with other organizations. IT is used in an integrated way to automate the workflow, providing tools to improve quality and effectiveness so that the organization is quick to adapt.

The CMM model (not shown) also has levels to indicate the control maturity. The levels range from 0-5. Level 0 indicates that no process is in place. Level 1 indicates that the base practices are being performed, but they are only being "performed informally." Level 1 focuses on whether an organization or project performs a process that incorporates the base practices and thus level 1 can be characterized by the statement, "you have to do it before you can manage it." For level 2, the processes are "planned and tracked." Level 2 focuses on project-level definition, planning, and performance issues and thus, can be characterized by the statement, "let's understand what's happening on the project before defining organization-wide processes." In Level 3, the processes are "well defined," which focuses on disciplined tailoring of the defined processes at the organization level. This level can be characterized by the statement, "use the best of what you've learned from your projects to create organization-wide processes." Level 4 indicates that processes are "quantitatively controlled," which focuses on measurements being tied to the business goals of the organization. Although it is essential to begin collecting and using basic project measures early, measurement and use of data is not expected organization-wide until the higher levels have been achieved. This level can be characterized by the statements, "you can't measure it until you know what 'it' is" and "managing with measurement is only meaningful when you're measuring the right things." Level 5 indicates that the processes are "continuously improving." Level 5 gains leverage from all the management practice improvements seen in the earlier levels, and then emphasizes the cultural shifts which, if implemented, will sustain the gains made. This level can be characterized by the statement, "a culture of continuous improvement requires a foundation of sound management practice, defined processes, and measurable goals."

In block 138, the maturity portfolio is created. The maturity portfolio provides transparency for all controls and includes all processes that support each of the controls. FIG. 5A illustrated an example of the maturity portfolio 500 in accordance with one embodiment. In FIG. 5A, compliance remediation 506 is the only control shown in the maturity portfolio 500. Although only one control is illustrated in the maturity portfolio of FIG. 5A, more than one control may be included in the maturity portfolio 500. Also, one or more processes 504 are illustrated in connection with the control 506. The control 506 is mapped to a maturity level 502 using the COBIT/CMM models, as previously discussed. For example, the "compliance remediation" control 506 has a maturity level 502 of "repeatable" 509 associated therewith. This indicates a low level of maturity. Additionally, as shown in FIG. 5A, each of the processes 504 may have a maturity level 502 associated therewith. For example, the "ESM Server Compliance Remediation" process 508, which is a process that is associated with the "compliance remediation" control 506, has a "repeatable" maturity level 510 associated therewith. By way of another example, a maturity level of "Non-existent/New" 512 is associated with the "Firewall Ruleset Remediation" process 514, which is also associated with the "compliance remediation" control 506.

After the maturity portfolio is developed, controls 506 are mapped to the risks/threats, as represented in block 140. This mapping creates a control portfolio, as represented in block 142. For example, the control portfolio 142 is created by mapping the risk score values 212 of each risk/threat 204 from the threat portfolio 230 (FIG. 2B), as previously described with respect to block 128, to the maturity portfolio 138. As shown in the illustrative embodiment in FIG. 5B, the control portfolio 530 includes categories such as programs 522, functions 524 and controls 526 and a matrix of threats 528 mapped to each of the controls 526. The "compliance remediation" control 530 has values for one or more threats 528 mapped thereto. The values of the respective threats 528 are mapped to the "compliance remediation" control on the control portfolio. For example, the "compliance remediation" control 530 aids in managing the "insider threat" risk 532 and thus, the value 534 of the "insider threat" (e.g. "81") is mapped from the "insider threat" risk 532 to the "compliance remediation" control 530. The value of "81" is calculated based on the "insider threat" 532 being a high impact (e.g. having a value of "9") and having a high probability (e.g. having a value of "9"). As previously discussed with regard to FIG. 2, the threat value is calculated by multiplying product of the impact (e.g. having a value of either 1, 3, or 9) and probability (e.g. having a value of either 1, 3, or 9) and thus, resulting in an "81" value for the "insider threat." In any event, one or more of the other threats associated with the "compliance remediation" control 530, such as "fraud" 536 or "unauthorized access" 538, are also mapped to the control portfolio 520 in a similar fashion as described with regard to the mapping of the "insider threat" 532. The control portfolio 520 enables the organization to quickly evaluate the span of control in relation to the threats 528.

Once the control portfolio 520 is completed, the control strategy is applied via a strategy mapping, as represented in block 144. The control strategy is determined by the organization. In other words, the organization will determine which blocks in the 9-block NIST model will have the highest, middle, and lowest level of control. For example, in the illustrative embodiment 600 of FIG. 6, a color-coded legend 602 shows the strategy mapping for the threats on the 9-block NIST model 604. In this 9-block NIST model 604, the upper-row right-hand block 606 (and thus, all threats located in this block 606) was chosen to receive the highest level of control; the top row-middle and the right-hand middle-row blocks 608 (and thus, all threats located in these blocks 608) were chose to receive an above average level of control; the top-row left-hand block, center block and bottom-row right-hand block 610 (and thus, all threats located in these blocks 610) were chose to receive an average level of control; the left-hand middle-row block, and the bottom-row middle block 612 (and thus, all threats located in these blocks 612) were chose to receive a below average level of control; and last, the bottom-row left hand block 614 (and thus, all threats located in this block 614) was chosen to receive the lowest level of control. Thus, since the organization, in this example, has decided to have a control strategy that all high risk threats should have a highest level of control, the organization must determine which controls need to be at the highest control level. Similarly, the organization must determine which controls need to be at an average control, above average control, lowest control, and so on. To do this, a score is calculated based on the threat ratings as well as how many threats are mapped to the control. For example, each threat gets a score based on position in the 9-block model 604. Then, for each control, the risk score for each threat associated with the control is aggregated giving a total threat score for each control. This is process is discussed in more detail below with respect to FIGS. 7A-C.

After the strategy mapping is achieved represented by block 144 of FIG. 1, each process has a level of maturity established using COBIT, CMM, other maturity models and/or a combination thereof. Next, in block 146, a target maturity state is established for each control based on the control strategy. The target maturity for each control optimizes the control portfolio in both span and maturity to achieve the desired risk mitigation level. For a threat that has high probability and high impact, the highest span of control as well as maturity is desired. For example, controls having a high level of threat may have a target set at "Managed," controls having medium level of threat may have a target set at "Defined," and controls having a low level of threat may have a target set at "Repeatable."

Also in block 146, the current level of the control maturity is determined. For example, by applying a value of 1, 3, 9 for low, medium and high, respectively, based on the NIST 9-Block 700 in FIG. 7A, each threat 702 receives a score 704 as is illustrated in FIG. 7B. As previously described, by using a simply risk formula (Risk=Impact×Probability), a threat score 704 is calculated. For example, the threat 702 of "fraud" 706 has a medium impact 708 on the NIST model 700 of FIG. 7A, which correlates to a "3" value. Similarly, a medium probability 710 on the NIST model 700 results in a value of "3." Therefore, the "fraud" threat 706 receives a final score of "9," which is calculated by multiplying the impact value of "3" times the probability value of "3." This process is repeated for each of the threats 702 in the NIST model 700. Because each control 710 may be mapped to multiple threats 702, a cumulative score 712 is calculated based on the threats 702 linked to a particular control. For example, in FIG. 7C, the "supplier assessment" control 710 has six threats 704 associated therewith, including "insider threat," "unintentional error," "malware," "botnets/DDoS," "fraud," and "unauthorizied access," and each of the respective threats values are 81, 81, 27, 9, 9, and 3, respectively. Thus, the total score 712 for the "supplier assessment" control 710 is determined by the adding the respective threat values 704 (i.e. 81+81+27+9+9+3), which equals a total score of 210.

After achieving the total threat score 712 of a control 710, the total threat score 712 is compare to threshold values for the COBIT/CMM models. In one embodiment, the threshold values are determined based on all of the selected threats. For example, if the sum 712 of all of the selected threats' values 704 equals 190, then the threshold value for the "managed" level will be 190. In this instance, since the control total score 712 was calculated above to be equal to 210, this would exceed the 190 threshold value and thus, the current maturity level of the "supplier assessment" control 710 is determined to be at "managed." The other level thresholds may also be determined in a similar fashion. For example, the threshold level of "defined" and "repeatable" is set at, for example, 90 such that if the total threat score 712 of the control 710 is less than 90, then the current maturity level is "repeatable." However, if the total threat score 712 of the control 710 is greater than 90, then the current maturity level is determined to be "defined."

In addition to the target maturity, in block 146, the second layer of control that will be analyzed is the span of control. Analyzing the span of control allows for the organization to determine when additional controls are needed rather than a more mature control or process. In the exemplary chart 800 shown in FIG. 8, the span of the controls on sensitive data leakage is illustrated. As is clearly indicated, the current level 801 of the encrypted non-public information (NPI) monitoring control 802 is non-existent. Thus, the span of controls demonstrates which controls 804 are strong as well as which controls 804 are non-existent.

After the initial modeling is complete, it is necessary to conduct an assessment of all related systems, policies, procedures and practices and accompanying it with a security risk analysis. While performing this assessment, it is important to review key business processes, workflow, and data flow, giving special attention to use, storage and transmission of data. Gaps due to low maturity must be identified in order to reach the target maturity for each process, as represented in block 148. Also, after a current span of control and target span of control is established, gaps need to be documented in order for planning to move forward to close the gaps and reach the desired target state.

The organization should identify gaps between the organization's current policies, procedures, systems and applications in all facilities in order to minimize any disruptions to your services, financial penalties and audit issues. This is done in contrast to many organizations which might wait for gaps to be identified for them by external third parties, audits or regulatory agencies. In order to ensure ongoing process stability, one should look at future business trends in order to anticipate changes in both internal and external factors that may be relevant to the organization's product/service stream. Such factors include future business demands (new products/services, acquisitions, etc), resource capacity and training, regulatory assessment, data flow and integrity evaluation, information latency evaluation, communication gaps, and reaffirming key performance indicators.

As can be readily seen in FIG. 8, a gap is identified for the NPI encrypted monitoring control 802 due to the discrepancy between the current level 805 of "non-existent" 801 and the target level 806 of "initial" 808. By way of another example, there is a maturity gap for the "proxy block" control 810 where the current maturity level 805 is lower ("initial" 812) than the target level ("repeatable" 814).

After potential process gaps have been identified, work can begin towards making improvements to the overall process and begin brainstorming the best solutions to fill these gaps (both non-existent gaps and maturity gaps). Further, after process gaps and inefficiencies have been identified, a control accelerator (described below with respect to FIG. 9) is used to establish appropriate level of control needed for the threat.

FIG. 9 illustrates the overall control framework process via a block process diagram 900, where a threat 902 attempts to enter the system 904 through the gap 906. The control pieces 908 are needed to cover all gap areas 906 such that the threat 902 cannot breach the system 904. In leveraging the span of control 910, the control pieces 908 can be expanded over the gaps 906 and new control pieces (not shown) can be added to cover the expanded risk gap area 911, which may result through acquisitions, identified non-existent control areas, etc. Thus, the full enterprise coverage area 912 should be covered by the controls 908 such that the "current control state" 914 (shown having gaps 906) should be at the "target control state" 916 (not shown, but all gaps shown be covered by the control pieces 908).

As represented in block 150, the gap portfolio is created by comparing the current state of the control portfolio with the target levels. An example of the gap portfolio 1000 is illustrated in FIG. 10A. As is illustrated, the gaps 1001 are identified in the gap portfolio 1000. The gap portfolio 1000 may also include an action plan 1010 to detail the roles and responsibilities 1012 of those in the organization to establish, manage and review the controls. A sample action plan 1010 is illustrated in FIG. 10B.

In block 152, after data is gathered, each organizational sector or group evaluates and prioritizes the gaps based on related threats and overall control level and resources available within the team. Once the evaluation and prioritization is complete, any organizational risk needs to be escalated to a governing body in the organization in order to manage risk appropriately within the organization.

In block 154, the risks are managed by the organization. The risk management process is utilized to establish transparency with senior management. As previously mentioned, the risks are escalated to an organizational governing body. The governing body consists of the company executives, such as managers, CIO, and other executives, as well as the risk management sector which determines and manages risks for the organization. The organizational governing body makes the decisions to accept, avoid, mitigate, or transfer the risks based on a case-by-case basis. In assisting in making these decisions, the gap portfolio is used to provide the gap information as well as the risks posed. In other embodiments, one or more of the other portfolios (e.g. threat portfolio, control portfolio, maturity portfolio, etc.) are used in the decision-making process.

If the decision is to accept the risk, the governing body accepts the possibility of consequences in the event that the risk becomes reality. The acceptance by the governing body is be documented and signed by governing body at the time of the decision. An example of when a governing body may accept the risk is if the costs of managing the risk exceed the reward or advantages of management of the risk.

If the decision is to avoid/eliminate the risk, the governing body may discontinue the technical or business activities associated with a particular risk. For example, the governing body may eliminate a particular operating system which may present risks through its use. By eliminating the operating system, any associated risks are avoided.

If the decision is to mitigate the risk, the governing body may seek to reduce the magnitude of a potential risk consequence or to reduce the likelihood of the consequence arising, by, for example, reducing casual threats or eliminating vulnerabilities. To mitigate the risk, business approval from the governing body, for example, needs to be acquired.

If the decision is to transfer the risk, the governing body assigns the line of business or sector responsible for taking responsibility for at least some of the consequences associated with a particular risk. In this case, the governing body may indemnify or compensate the line of business for any resulting consequences of a particular risk.

In any event, based on the decision of the governing body, each team is responsible for taking the appropriate action to close the identified gaps. In decision block 156, a determination is made as to whether funding is required to close a particular gap. If so, a business case is developed, as is described in more detailed with regard to block 160. On the other hand, in block 158, if no funding is required and approval is granted, the sector of the organization which is responsible for the control implements actions and/or controls to close the gaps.

If needed, each team can utilize the control accelerator, as previously mentioned, in order to establish an adequate level of control for the organization. The control accelerator is a defined process with tools & templates that drive clarity on how to move from little or no control to detective/preventative controls. As illustrated in FIG. 11, opportunities to improve controls and gaps are identified (block 1102) by the outside environment, such as business drivers 1104, audit issues 1106, and/or threat modeling 1108, and by the effectiveness of the control in the current environment. After the gaps have been identified 1102, controls are developed via a control development model 1110, which begins with the control accelerator 1112. The control accelerator 1112 quantifies the risk and control environment and provides a set of repeatable processes and tools to improve the control environment. The output of the control accelerator will be new or enhanced processes and/or control tools. Process maps 1114 drive the processes and controls by assigning roles and responsibilities and allow the proper organizational sectors to carry out the processes and controls. The new or enhance controls and processes are measured for effectiveness using a control dashboard 1116. The control dashboard 1116 provides a high-level view at the control environment as a whole. Continuous improvement 1118 back to the beginning of the process in FIG. 11 allows for new processes and controls to be developed as well as improving current processes and controls.

In block 160, a business case is developed to justify the need for additional controls or modifications to existing products and/or services. New business case initiatives are created to either meet the changing demands of a particular business process or to address possible deficiencies or gaps. Business case development supports key organizational considerations in making a decision for pursuing a new opportunity or approach. As a communications vehicle, the business case identifies goals and measures for tracking the move to the final end state. Business case development typically examines five areas of organizational planning to make their case statements: 1) deciding goals and actions, including developing alternative approaches; 2) estimating the likely costs and developing potential risks; 3) estimating the likely benefits; 4) developing a proposal for proceeding; and 5) closing the deal, including making final adjustments and proceeding to development.

In block 162, the control transparency portfolio incorporates people, sectors/groups, processes and technology to have an established risk profile for all gaps as well as current controls. FIG. 12 illustrates an example of the control transparency portfolio 1200 in accordance with one embodiment. As illustrated, the control transparency portfolio 1200 adds to the gap portfolio 150 the risks involved 1202, risk decision 1204, the person who approved the risk 1206, and whether the risk is funded or not 1208.

FIG. 13 is a block schematic of an example of a system 1300 for the control transparency framework in accordance with an embodiment of the present invention. The system 1300 may include a module for control transparency framework (hereinafter "control transparency framework module") 1302 operable on a computer system 1304, or similar device of a user 1306 or client. Alternatively, or in addition to the control transparency framework module 1302 on the user's computer system 1304 or client, the system 1300 may include a control transparency framework module 1308 operable on a server 1310 (hereinafter "server control transparency framework module") and accessible by the user 1306 or client 1304 via a network 1312.

Similarly, the system 1300 may include a module for accessing the control automation tool or system ("CAT") 1400 discussed in greater detail below. The module, stored in the file system 1316 such as memory of the computer system 1304 of the user 1306 is referred to as a workstation module for CAT 1401. The workstation module for CAT 1401, in some embodiments, is configured for providing a user interface 1800 for the CAT 1400 discussed in greater detail below with reference to FIGS. 18A-18K. The CAT 1400 includes several modules as shown in FIGS. 14 and 15 and described below in detail. Examples of the modules of the CAT are the control profile/processes module 1410 and the metrics module 1420. The illustration of FIG. 13 is intended as an example, and modules 1402 and 1404 are representative of one or more of the various modules associated with and included in the CAT 1400. A "module" is hardware individually or a combination of hardware and software stored and/or executed on the hardware. Each module may be or include one or more databases or datastores, one or more computer systems, servers, networks, or other storage or computing devices or combination of devices. Further, modules may include computer executable instructions stored on a non-transitory computer readable medium for execution by one or more computing devices such as one or more computer systems, servers, networks or other devices.

A module 1402 of the CAT 1400 is illustrated running on a server 1310. Also illustrated is a module 1404 of the CAT 1400 stored as part of a database or other data storage device 1403. In some embodiments, the database 1403 as a whole or in part is is part of the module 1404, in combination with computer executable instructions. In other embodiments, as discussed above, a module 1402 or 1404 may be running on one or more of a variety of computing devices or may be or include one or more of a variety of computing devices.

The methods 100, 900 and 1100 may be embodied in or performed by the control transparency framework module 1302 and/or the server control transparency framework module 1308. For example, the methods 100, 900 and 1100 may be performed by the control transparency framework module 1302. In another embodiment of the invention, the methods 100, 900 and 1100 may be performed by the server control transparency framework module 1308. In a further embodiment of the present invention, some of the features or functions of the methods and systems 100, 900 and 1100 may be performed by the control transparency framework module 1302 on the user's computer system 1304 and other features or functions of the methods 100, 400, 500, and 600 may be performed on the server control transparency framework module 1308.

Similarly, the method 1700 described below and the various modules 1402 and 1404 of the CAT 1400 may be stored on and executed by a computer system 1304 as represented by the workstation module for the CAT 1401. Likewise, method 1700 and the computer executable instructions included in the various modules 1402 and 1404 of the CAT 1400 may be stored on and/or executed by one or more computing devices such as the server 1310, the database 1403, other servers or computing devices connected to the network 1312 or the like, either individually or in combination. That is as discussed above, a module 1402 or 1404 or part of a module, may include more than one computing device or datastore, may be stored on more than one computing device or datastore, and may be executed by more than one computing device either in conjunction or individually.

The network 1312 may be the Internet, a private network or other network. Each computer system 1304' may be similar to the exemplary computer system 1304 and associated components illustrated in FIG. 13.

The control transparency framework module 1302, 1308 and CAT modules 1401, 1402 and 1404 may be self-contained systems with embedded logic and may be or include decision-making, state-based operations and may include other functions. The self-contained system may allow businesses, individuals, services, locations, and the like to obtain data and/or information related to controls, risks/threats, strategies and the like.

The control transparency framework module 1302 may be stored on a file system 1316 or memory of the computer system 1304. Likewise, the CAT modules 1401, 1402, and 1404 may be stored on a file system 1316 or memory of the computer system 1304. The control transparency framework module 1302 and the CAT modules 1401, 1402, and 1404 may be accessed from the file system 1316 and run on a processor 1318 associated with the computer system 1304.

The user computer system 1304 may also include a display 1330 and a speaker 1332 or speaker system. The display 1330 may present information related to the control transparency framework system 1300, such reports, portfolios, and the like, as described herein as well as information related to the CAT 1400 and the CAT interface 1800, and may permit input of data and information into the system 1300. Any other GUIs (not shown) associated with the control transparency framework module 1308 and the CAT 1400 may also be presented on the display 1330. The speaker 1332 may present any voice or other auditory signals or information to the user 1306.

The user computer system 1304 may also include one or more input devices, output devices or combination input and output device, collectively I/O devices 1334. The I/O devices 1334 may include a keyboard, computer pointing device or similar means to control operation of the control transparency framework processes 100 and system 1300, and the CAT 1400 as described herein. The I/O devices 1334 may also include disk drives or devices for reading computer media including computer-readable or computer-operable instructions.

Referring now to FIGS. 14-18, a control automation tool ("CAT") 1400 is configured for providing a generic repository for operational business controls and supporting discrete management of the controls and their corresponding metrics. In some embodiments, the CAT 1400 includes one or more software applications stored and/or running on one or more computing and/or storage devices as discussed above. Further, the CAT 1400. A central Control Management module 1405 represents computer instructions running on a server, in some embodiments, and connected with one or more relational, closed-loop data repositories that make up some or all of the various CAT modules 1402 and 1404. As discussed above, the use and maturation of a control within an organization depends on management of operational performance and expenses, which the CAT assists through lean project management, effective implementation of action plans and financial functions. Further, people resources, organizational hierarchy and access management functions are used to support mapping of controls arranged by organizational unit and support access permissions that are consistent with appropriate data management. The CAT 1400 also provides transparency (i.e., ease in understanding and use) and meaning to status and relevant data regarding controls and their associated metrics.

FIG. 14 illustrates one embodiment of a control management database schema as implemented and managed by the CAT 1400 in order to enable effective management of controls and their associated metrics. Central to the database schema of the CAT 1400 is the Control Management module 1405, which represents administrative and operational management of controls and metrics using some or all of the modules conceptualized in the database schema. Examples of the data stores and modules associated with and used by the CAT 1400 include, but are not limited to, Control Profile/Processes 1410 and Metrics 1420. Also included in the database schema of the CAT 1400 are Projects/Business Case Financials 1425, Business/Operational Functions 1430, Action Plans 1435, Organization Policy/Standards/Baseline 1440, People Resources 1445, Organizational Hierarchy 1450, and a Threat/Risk Master Profile 1455. The CAT 1400, in some embodiments, also utilizes the various modules, data stores, and inputs regarding Gap and Audit Exception Profiles 1460, Maturity Assessment 1465, and Risk Profiles 1470.

In some embodiments, the Control Profile/Processes module 1410, the Risk Profile module 1470, the Maturity Assessment module, and the Gap and Audit Exception Profiles module 1460 are all considered part of a Control Repository 1467, and in some embodiments, the Action Plans module 1435 is also included in the Control Repository 1467. The Control Repository, as discussed below with greater detail regarding the individual modules, enables control profiling based on specific parameters including defining multiple controls with varying scopes. The Control Repository enables control maturity evaluation based on unique assessment criteria and, in some embodiments, enables initiation and management of one or more action plans for each individual or groups of controls. Through the CAT 1400, the Control Repository enables unique maturity criteria selection by the user, and one or more action plans are populated and implemented based on the selected criteria. Furthermore, the Control Repository enables organized accumulation of data regarding one or more controls and enables web-based distribution and analysis of the data.

In some embodiments, the Metrics module 1420 is referred to as a Metrics repository 1469. The metrics repository 1469 enables generic metric profiling. That is, the repository enables profiling metrics regardless of the topic related to the metric. As such, the metric repository 1469 is generally considered "generic" or "non-topic specific." This should not cause confusion with the functionality of the metric repository 1469, which does provide for profiling various metrics with a nearly endless opportunity for defining metrics using numerous parameters and topic-specific definitions. For example, metrics defined to measure any unit of measure, metrics requiring any reporting frequency, and metrics based on any calculation method are supported by the metric repository 1469. The metric repository 1469 also enables metric data collection and reporting.

The various modules and components of the CAT 1400 are illustrated with greater detail in FIG. 15. As discussed above, controls, in very general terms, are operational processes focused on active risk management and reduction of risk within an organization. The Control Profile 1410A represents the specific operational parameters associated with a control for effectively and uniquely defining each and every control. The "control owner" is the creator of a Control Profile 1410A. The control owner specifies the parameters of the control using the CAT interface as discussed in detail below. Furthermore, a "control management team," typically comprised of one or more members of a vulnerability management or risk management team within an organization also holds various responsibilities regarding management of controls and their associated metrics. For example, the control management team, in some embodiments, has the responsibility for validating the parameters associated with each newly created control by the control owner. Also included in the Control Profile module 1410A are data stores including calculation algorithms and calculation results associated with the control such as the effectiveness of the specific control. Module 1410A also includes the factors or criteria used to perform the calculations regarding effectiveness of the specific control.

Further, the Control Profile module 1410A includes control coverage data including information corresponding to other distinct controls that are correlated with the specific control. Similarly, the metrics correlated with the specific control. In addition, in some embodiments, the Control Profile module 1410A includes security as a feature of the control. For example, the Control Profile 1410A includes, in some embodiments, information indicating a security level of the control such as detailing the users who, when using the CAT interface, can modify particular parameters of the control. Typically, a default configuration allows the control owner, the control management team and any other "administrator" or individual holding special control management privileges the ability to access and modify the parameters associated with a control.

A control typically includes processes that work to mitigate risk and threats that, if unchecked, can impact the organization's business functions. Threats and risks must be mapped or identified and associated with one or more controls. The Control Processes module 1410B represents the various processes included in the control via process maps. For example, in one embodiment, the control processes are mapped using the Architecture of Integrated Information Systems (ARIS, a product of IDS Sheer AG) methodological framework. Furthermore, the Control Processes module may include, in some embodiments, additional application data such as control evidence, Discovery LINKS and SharePoint URLs. In addition, the Control Processes module 1410B includes, in some embodiments, data regarding best practices such as COBIT and NIST described above or other standards such as Information Technology Infrastructure Library (ITIL) for managing information technology services, development and operations or the Federal Financial Institutions Examination Council (FFIEC), a United States government agency prescribing standards for financial institutions or others.

Identification, categorization and valuation of operational risks and/or threats are fundamental to the development, deployment and durability of effective controls. The Risk and Threat Master module 1455 is configured for profiling the operational risks and threats with a variety of parameters used for process control and as a foundation for risk or threat severity, probability and impact analysis. These parameters or attributes, combined with similar parameters for controls, are aimed at providing quantification for furthering understanding of risk impact to the control and the organization, acceptable risk (i.e., residual risk), and control effectiveness for the operational areas supported by one or more specific controls.

The Risk and Threat Master module 1455 includes a repository for operationally relevant risks and/or threats. The risks and/or threats within the repository are categorized based on the type and/or severity of the risk or threat. For example, a malware threat may be categorized broadly within the cyber-threat category or an earthquake threat may be categorized broadly within a geological risk category. Furthermore, in some embodiments, the module 1455 includes a detailed and descriptive profile for one or more of the risks and threats within the repository such that a broad population throughout an organization will have information necessary to understand the given risk or threat and how the risk or threat may impact the area of business relevant to each individual. In various embodiments, the profiles may include information such as risk definitions, risk ratings and information regarding mitigation of the risk such as potential risk-limiting processes or activities. Additionally, in some embodiments, information regarding the severity of the risk as well as information regarding the hierarchy of the risk is included in the risk profile. For example, the risk may be categorized as a general risk, indicating that it is applicable across a wide breadth of areas within the organization, it may be categorized as a specific risk, indicating that it is only applicable to a select one or a few areas within an organization or it may be categorized as a detailed risk, indicating that various factors determine the scope of the risk. Also, historical risk ratings may be included in the repository forming a basis for future risk ratings and categorizations or for historical risk analysis among other applications. Another characteristic of the Risk and Threat Master module 1455 is the quantification of the risks and threats in order to reduce the level of subjectivity when considering each risk or threat. This is done by including information regarding a variety of attributes of each individual risk or threat such as, for example, the risk severity, the risk severity within different types of business environments, the probability of occurrence of the risk and the rationale for arriving at the probably, and similar, non-subjective means for viewing each individual risk.

Each control is focused on mitigating, in some form or fashion, defined risks and threats. The Risk Profile module 1470 is a data repository for risks selected by the control owner, control management team or control administrator for association with the specific control. Typically, the Threat/Risk Master Profile 1455, discussed immediately above, includes a comprehensive list of the risks and threats defined by the organization, and the control owner chooses from the Risk Master Profile 1455 the specific risks and threats to be associated with the specific control via the CAT 1400 interface as discussed further below. As such, the Risk Profile module 1470, in combination with other control parameters, allows the CAT 1400 to calculate control effectiveness and residual risk. The risk calculations allow for use of Action Plans 1435 to effect change in the performance of a control to modify the level of risk mitigation as required by the overall operating environment. In some embodiments, the Risk Profile module 1470 is referred to as the "risk repository," and in others the combination of the Risk Profile module 1470 and the Risk Master Profile 1455 is referred to as the "risk repository."

The Metrics module 1420 allows the CAT 1400 to create, implement and manage the metrics associated with controls. As discussed above, a metric provides a quantitative, repeatable process to determine how well a control is performing. Such determination may relate the control's operational functionality or relate to how well the control is mitigating the intended risk and threat targets or both. A number of parameters are combined to define a particular metric. Examples of such parameters, in some embodiments, include units of measure, frequency of reporting, the type of metric and the like. Another metric parameter involves threshold levels for evaluating progress towards the goal of the metric. Periodic review of the status of a metric is typically performed by each organizational area to ensure the threshold and other metric parameters are being maintained and that the metric is adequately measuring the performance of its associated control. Further, data is collected regarding metric value history to enable variance analysis and trend analysis, and the parameters of the metric are analyzed to ensure they are appropriately representative of the data being collected. Management processes such as the periodic review and data collection and analysis aid the organization in optimizing the control environment.

The Metric module 1420 enables a metric profile, which provides the control owner, metric owner and any other individual or group with authorization, to create a metric directly related to a control and the user can associate the metric with the particular control or controls as desired. Additionally, the user can define the parameters of the metric and what is measured while also specifying the relevance of the metric to the control(s). The module 1420 also enables input of the metric parameters discussed above such as the metric value threshold. As discussed in greater detail below, the CAT 1400 interface displays various color-coded indicators to communicate to the user whether the metric value is within one range or another range.

For example, in one embodiment, there are two thresholds defining three ranges related to metric values. Specifically, for example, one threshold is set between 70 and 71 (out of 100) and one is set between 90 and 91 (out of 100). Thus, there are three ranges: 0-70, 71-90, and 91-100. In some embodiments, the color red is assigned to the lowest range, yellow to the middle range and green to the upper range. Metric values falling within the red range are typically thought of as needed immediate attention and improvement. Those within the yellow range are considered less urgent priorities than those in the red range, but nevertheless, require attention and improvement. And finally, those within the green range are considered acceptable, therefore requiring no present action.

The control owner and the metric owner, in one embodiment, have access to management of the metric thresholds. Also, the module 1420 enables entry of metric values at different levels or areas within an organization where a metric is used. For example, in one business unit, the metric owner inputs a first value for the metric and in another business unit, the metric owner, using the same metric, inputs a different metric value. Finally, the module 1420 also enables a metric action plan (discussed below with reference to Action Plan module 1435) that is developed when metrics are new or emerging (as discussed further below with reference to the CAT 1400 interface) or when they are red or yellow status as discussed above.

The Maturity Assessment module 1465 represents a process enabling a structured measurement of the organization's ability to understand and use a specific control. The module 1465 assesses the adequacy and completeness of the operational documentation describing the specific control's ability to mitigate the threats and risks identified from the Risk Master Profile 1455 as being reduced by the control and included in the Risk Profile 1470 associated with the control. Typically, in some embodiments, regular or periodic assessments are conducted for each control managed by the CAT 1400. The assessments usually include organizational interviews with the people associated with and implementing the controls and thereafter discrete scoring is conducted regarding the control's maturity level. Generally, a set of maturity criteria has been established by a control administrator or owner that details the criteria, templates, and/or milestones necessary for the control to move from a lower to a higher maturity level. A validation and verification checklist includes a standard list of questions associated with the various levels of maturity and is or is included in the organizational interviews administered or conducted with the control owners. The checklist requires the control owners to specifically identify any documentation and processes that are being used with regard to the control and any documentation and processes associated with, for example, the current level of maturity for the specific control that are not currently implemented. Such documentation and processes associated with the current maturity level are typically considered a gap requiring correction. In another example, a higher level of maturity than the current level requires a specific documentation or process that is not currently implemented, and such a deficiency may be considered a gap requiring correction before maturity is advanced. In some embodiments, the documentation and processes not currently implemented (also referred to as being validated) are automatically added to an action plan as an individual task to be completed.

As discussed with additional detail below, the CAT 1400 interface allows the control management, or other authorized individual or team, to verify the current status of the control maturity, the defined target maturity of the specific control, and coordinate the next assessment of the maturity of the specific control, among other functionality.

The Gap and Audit Exceptions Profile module 1460 provides a repository for profiles of operational and regulatory gaps. The repository also includes a data store of exceptions to what would normally be considered a gap so that the CAT 1400 will not act on what would otherwise be considered a gap.

The Action Plan module 1435 provides a list of activities necessary to close a maturity gap or attain a specific maturity level. An action plan, as managed by the CAT 1400 through the Action Plan module 1435, sustains the viability of controls, metrics and sound management by identifying, tracking, and bringing to closure actionable tasks in an organized and transparent manner. The Action Plan module 1435 supports creation, management, and archiving of basic task lists for aiding in control maturity progression as discussed above, as well as metric development and sustaining optimal performance. In some embodiments, the Action Plan module 1435 also assists in financial initiative tracking to assure effective use of project allocated financial resources to achieve defined results. The module 1435 also ensures any collateral actions are performed by the control owner or other actor in order to complete a specific action plan. An action plan, as discussed in further detail below, involves several steps including creation of the action plan, summarization of the action plan, automated or manual addition of individual tasks, input of status dates and commentary regarding progress of the action plan, and the ability to complete, close and archive a specific action plan. A new action plan may then be created and the action plan process reiterated. In some embodiments of the CAT 1400, the Action Plan module 1435 is configured generally thereby facilitating independent use, i.e. use without linkage with additional data sources. Furthermore, in some embodiments, the general configuration of the Action Plan module 1435 provides for future linkage with one or more additional modules, elements, or components within the database schema of the CAT 1400 or other system.

As discussed in additional detail below, the CAT 1400 interface allows the control owner, or other authorized individual or group, to manage the action plan(s) and their associated checklist(s). The action plan checklist, as discussed above, includes a standard list of requirements for each maturity level of a control, and the CAT 1400 interface enables the control owner to select various desired requirements to be included or removed from an action plan checklist. Further, the interface enables the control owner and the control management team, along with any other authorized individual or team, to manage the action plan once it has been created along with its associated checklist(s). The detailed action items within the plan are generated from the checklist allowing the user to visualize the items and their status.

The Business/Operational Functions module 1430 includes a repository of business functional classifications (i.e., taxonomy). The categorization and grouping techniques discussed above regarding controls and metrics enable the organization to obtain a summary view of its activities without inhibiting consideration and analysis of deeper, detailed information. The functional classification of various business functions, for example security functions, enables the grouping of controls, metrics, people resources, and projects. By using taxonomy of potential scenarios, interaction of controls can be portrayed in an operational context, and the relationship of operational risks, mitigating controls and business operations can be illustrated. This relationship also quantifies the defined interaction among the risks, controls and operations and enables prioritization of action for the organization. An example list of security scenarios taken from a list of a security classification taxonomy includes the following: Security Architecture and Models, Applications/Business Systems, Business Continuity, Roles and Responsiblities, Access Controls, . . . , Remote Access Security, and Supplier & Provider Security.

The People Resources module 1445 represents a repository where information regarding the people in the organization is mapped to specific controls and projects. Controls, although sometimes fully automated, typically are driven by the organizations and the people within the organizations. Maintaining such a people data store adds insight into the efficacy of a control. For example, a control having only one individual mapped thereto may not be able to reach its target maturity or a control having too many individuals mapped thereto may be over-staffed. The module 1445, in some embodiments, includes detailed identification and profiling of each individual, their organizations, team and basic organizational structure responsible for every control. Further, in some embodiments, the module 1445 includes identification of projects (and any codes associated with the projects, such as funding account codes) being performed by each individual. This enables reconciliation with operational accounting and project accounting requirements. Also, in some embodiments, the module 1445 includes alignment of staff to controls to support assessment of level of effort being allocated to a control. This enables management to "lift and shift" or transfer personnel, as required, to support controls that are either suffering in performance or new or emerging. Finally, in some embodiments, the module 1445 enables tracking of temporary personnel by range of dates working with a control, in order to support accounting reconciliation and control maturity level determination.

The Organizational Hierarchy module 1450 is closely related to the People Resources module 1445 and is connected with People Resources module 1445 and configured for providing a corporate directory for the People Resources module 1445. The module 1450 also includes data stores regarding the business functions of the various departments within an organization, the divisions within an organization, and, if desired, the organization itself. The module 1450 also, in some embodiments, includes information regarding the organization's management and departmental hierarchy.

The Organization Policy/Standards/Baseline module 1440 enables alignment of controls to an organization's policy, standards and baselines. Doing so provides the assurance that there is acceptance of the internal operational best practices while ensuring compliance with regulatory and legal requirements. The controls are mapped to these internal standards and general industry best practices (referred to as a "cross-reference" in the standards environment). This develops data for responding to potential audit and/or regulatory review, such as review by the FFIEC or the like. The module 1440 enables alignment of standard requirements, both high and low level standards, with controls based on Symantec correlation. Further, the module 1440 enables capture of standard best practices for use in validating control processes and procedures to industry standards. Finally, the module 1440 enables identification of gaps resulting from an analysis of the control and standards environment. That is, a gap would be indicated if a standard was present without any corresponding, mapped controls or if a control was present without any supporting, mapped standards.

The Projects/Business Case Financials module 1425 is a repository that provides a simple means for combining action plans, budgetary funding allocations, and people allocations with specific controls. Generally, the activities an organization performs can benefit from project management, and this module provides such management without the necessity of providing an entire, distinct project management systems. The module 1425 enables tracking projects to the objective established and financial funding relative to improvement of control coverage, increased maturity of specific controls, and improvement of control performance. The module 1425 provides these general project management capabilities that support identification and status tracking of projects including those projects specific to organizational initiatives and defined financial allocations. Further, the module 1425 is configured for connecting with the Action Plan module 1435 to provide general task definition, status tracking and closure.

The Control Management module 1405 represents the administrative management of the CAT 1400. Administrative management of the entire environment is needed to ensure responsive, positive changes. The administrative management includes access permissions for the various types of users associated with and using the CAT 1400 as well as database parameters for each of the operational areas. For example, the module 1405 enables changes to various profile attributes and updating of scoring parameters and the like. Further, the module 1405 enables management of addition and deletion of specific types of database records, such as new control approval, deletion of metrics, addition of risk and threats and the like. Finally, the module 1405 allows reduction of direct programming modifications to maintain the data environment that is current with the operational business functions.

Referring now to FIG. 16A, a flowchart representing an example of an application module process 1600 is shown. The process 1600 includes two arms. The first is based on internal application software assessment and includes application mapping to controls 1610, detailed assessment results 1620, and internal assessment criteria 1630. The second arm illustrates application of externally defined criteria including standard mapping to controls 1640, detailed assessment results 1650, and standards assessments 1660. As shown in FIG. 16A, the FFIEC standard is included as an example, but it should be understood that any standard can be used. The overall objective of the application module 1600, in this embodiment, is to provide both objective assessment and a reviewable record of the status of application software that may be business critical or subject to some standard compliance consideration.

Referring now to FIG. 16B, a flowchart representing a system functions module process 1700 is shown. The process 1700 includes application rights 1710, references 1720, marketing 1730, help applications 1740, and application administration 1750. The systems functions module enables managing the overall CAT 1400 system's functionality through system configuration. It also increases overall CAT 1400 system usability with help and reference information to assist CAT 1400 users, and general permissions for different levels of read/write access to data.

FIG. 17 is a flowchart illustrating the basic method 1700 for defining a control, assessing its maturity and closing gaps regarding the control so that it can progress to its target maturity level as discussed previously above with reference to the various modules comprising the CAT 1400. The first step 1710 is the Control Profile module 1410 enables creation of one or more controls including receiving input from the user or control owner regarding parameters defining the one or more controls. The next step 1720 is the Risk Profile module 1470, in cooperation with the Threat/Risk Master Profile module 1455, enables mapping risks and/or threats to the one or more controls. As discussed above, the user can choose the risk profiles from the master profile 1455 to include in the control's risk profile 1470 as desired. The risks and threats mapped to a particular control correspond to a particular score based on their probability of occurrence and impact. The total threat score is used by the CAT 1400 or by the control owner to determine the target maturity level for the particular control. For example, if the total threat score is very high, then the target maturity level may also be determined to be high and, likewise, if the total threat score is very low, then the target maturity level may also be determined to be low.

The next step 1730 is the Maturity Assessment module enables determining the maturity of the one or more controls. The Maturity Assessment module 1465, in the next step 1740, and in conjunction with the Gap and Audit Exception Profile module 1460, identifies operational, organizational and documentation gaps needing attention in order for the control to attain its target maturity state. In the final step 1750, the Action Plan module 1435 enables creation and updating of one or more action plans including one or more action plan steps to assist in closing gaps identified as needing attention.

In various other embodiments, different modules interact and work individually or together to perform one or more of the process steps discussed herein, and various other steps may be included or some steps may be excluded from the processes discussed herein. It should be understood that the CAT 1400 system provides general and basic functionality as described, but that the capabilities of the CAT 1400, due to its unique structure and combination of elements and modules, enables organizational relationships, management, and data sharing in a wide variety of ways.

FIGS. 18A through 18K illustrate various screenshots of the CAT interface 1800. The interface, in some embodiments, is a web-based application that provides access to the CAT 1400 functionality described herein. In some embodiments, the interface 1800 is accessible via the Internet, and in other embodiments, the interface 1800 is only accessible via an organizational intranet or internal network. The CAT interface, in other embodiments (and in the embodiment illustrated in FIGS. 18A through 18K) includes additional screens and functionality not specifically referred to in FIGS. 18A through 18K. These figures and the following description are provided in order to better illustrate the capabilities of the CAT 1400 discussed in detail above and are by no means comprehensive of the functionality of the CAT 1400 or the CAT interface 1800.

Figure 18A:
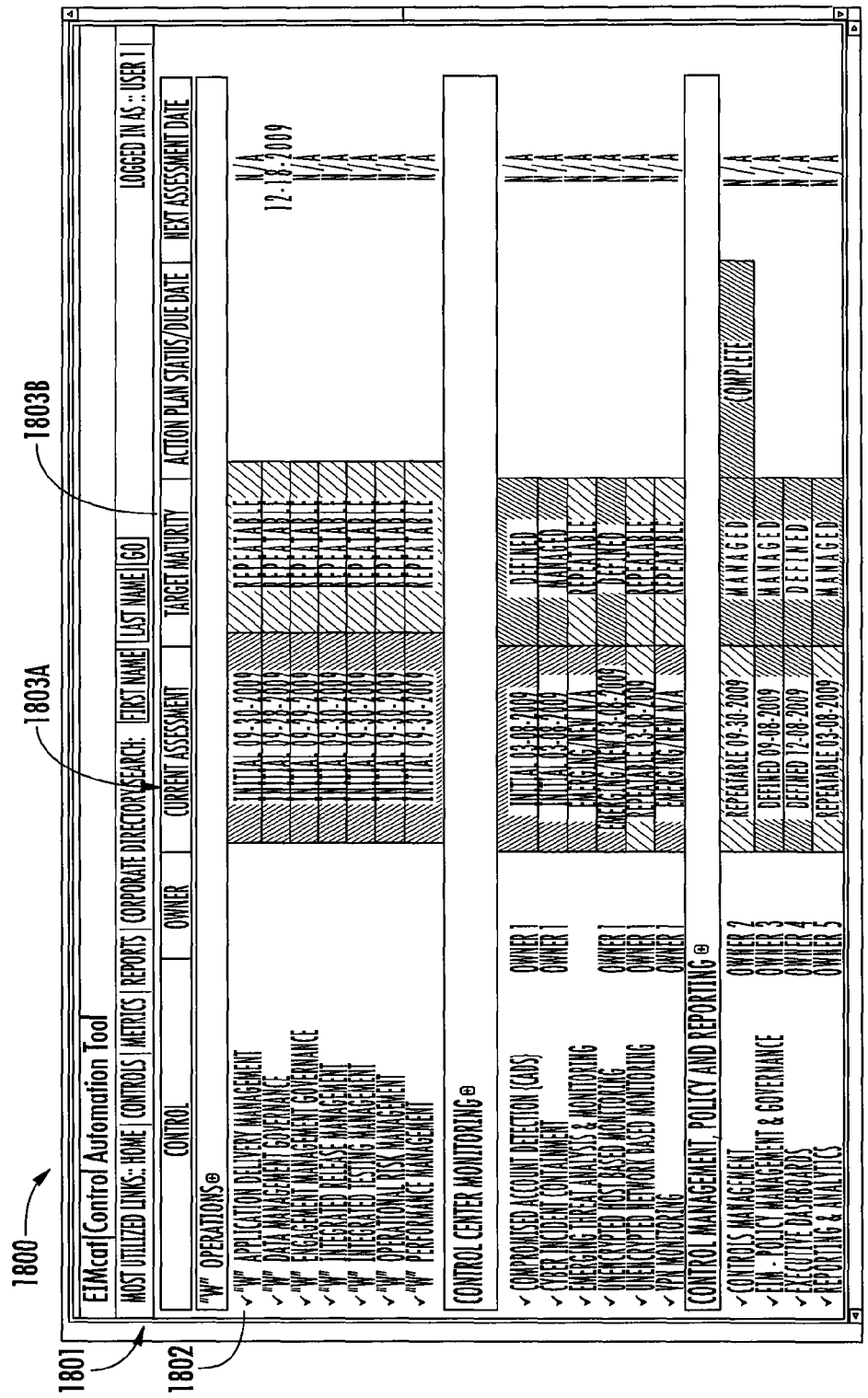

FIG. 18A is a screenshot of a control dashboard 1801, which presents all the controls managed by the CAT 1400. The controls, in the embodiment illustrated, are grouped by organizational group. For example, the first grouping of controls as shown is "'W' Operations" and the second is "Business Continuity" and so on. The control name is listed as are the control owners, the current assessment of the control, the target maturity, the action plan status and due date, and finally the next assessment date. In some embodiments, variations in the control dashboard are present for different users. For example, in one embodiment, the administrator's control dashboard includes controls that have been deleted, i.e., removed from the CAT 1400. Such deleted controls are indicated with an "X" as opposed to the checkmarks 1802 shown next to the names of the controls in FIG. 18A. As illustrated, the current assessment column 1803A and the target maturity column 1804B include both the category name of the maturity level and target maturity level of the control but also includes a color-coded or patterned background so that the user can easily discern the status of the control. In one embodiment, a red colored background maturity field indicates the control is "emerging/new" and may indicate the date of creation of the control in the CAT 1400. Yellow may represent a control that has been determined a "repeatable" control, and the field indicating the repeatable control also typically indicates the date the control became repeatable. Finally, green typically indicates that the control is "managed" or "defined". In the current assessment column 1803A, the date the control became managed or defined is typically included. Of course, there are no dates of achievement included in the target maturity column 1803B as there are in the current assessment column 1803A because the target maturity levels have not yet been achieved.

Figure 18B:
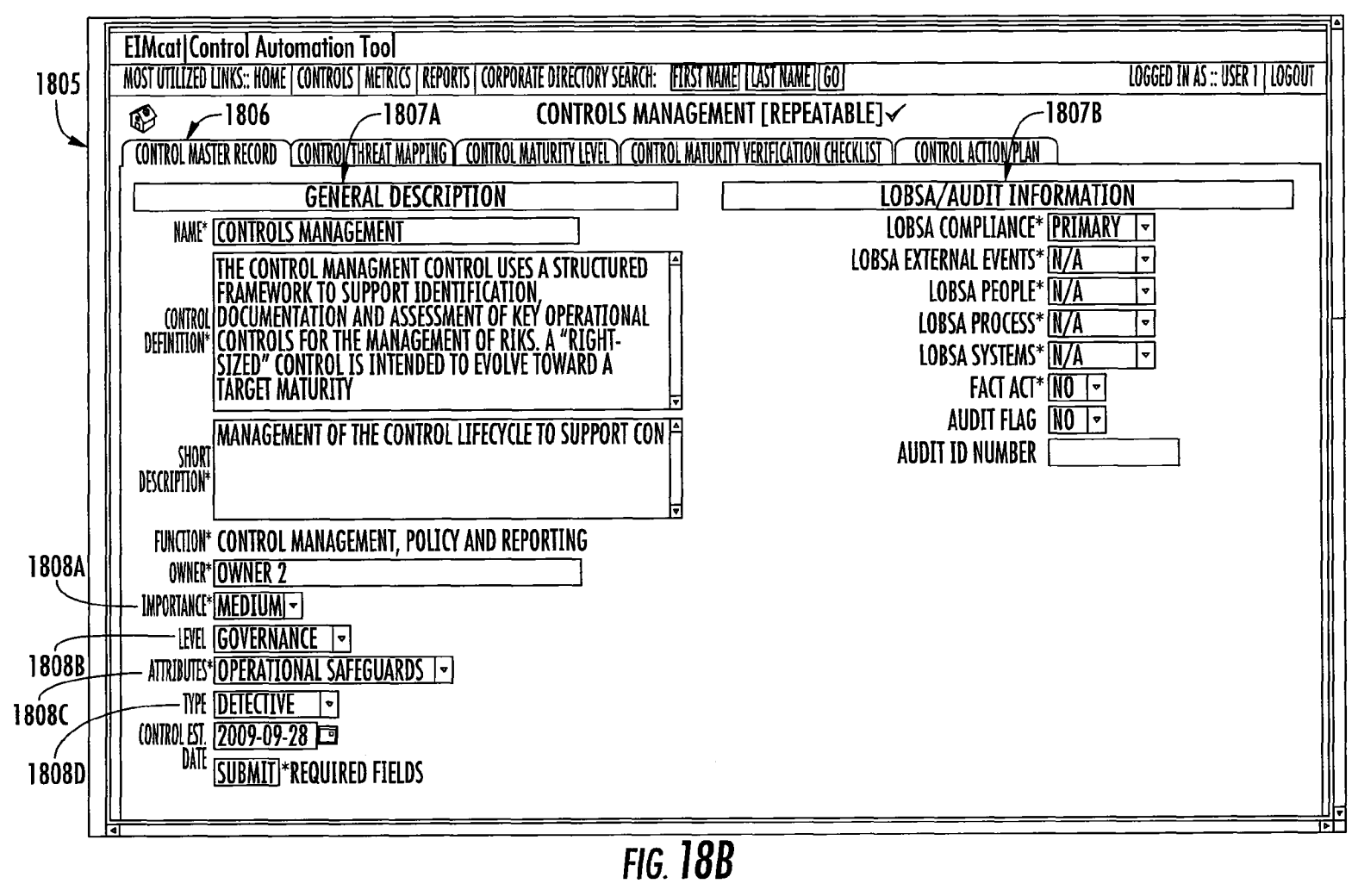

FIG. 18B is a screenshot of the control tab page 1805 sitting on the control master record tab 1806. The user navigates to this screen 1806 from the control dashboard 1801 by choosing the desired control from the list. The control master record tab 1806 screen includes various fields in a general description column 1807A for inputting parameters for defining the control including the name, control definition, the short description, function, owner, importance, level, attributes, type and inception date. Also included on this screen are fields for inputting auditing information in an audit information column 1807B, such as line of business self assessment (LOBSA) information. Notably, the current assessment of the control is indicated next to the name of the control on the title of the screen 1806.

The importance field 1808A includes the option to choose low, medium or high in some embodiments. The level field 1808B includes a governance option, which indicates the control is configured for defining rules, whereas an execution option indicates the control is configured for performing mitigation of risk or threats. The attributes field 1808C includes various options such as operational safeguards, countermeasures, manages risk or others. The type field 1808D includes various options such as corrective, detective, managerial, and preventive.

FIG. 18C is a screenshot of the control threat mapping tab 1810. As discussed above, each individual threat is scored based on probability and impact, and the threat is mapped to the control if desired. If the particular threat is not mapped to the control, its threat score is not included in the total threat score calculation for the control. More importantly, only the threats mapped to the control are associated with the control such that those threats are impacted by the control. For example, the "insider threat" risk is mapped and is therefore one of the threats the control is currently mitigating; whereas, the "malware" threat is not mapped to the control, and therefore, it is not one of the threats the control is currently mitigating.

Figure 18D:
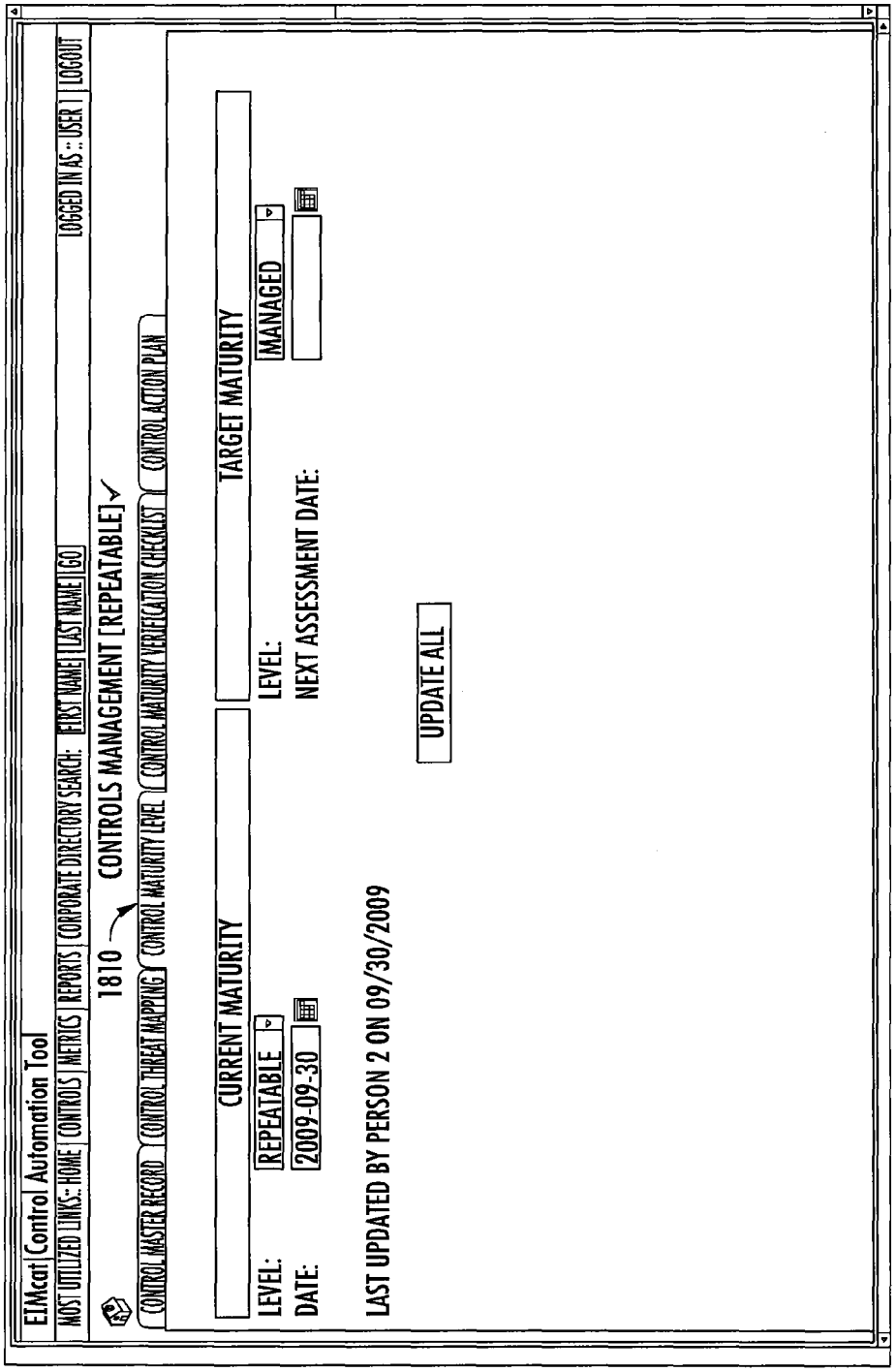

FIG. 18D is a screenshot of the control maturity level tab 1811. As shown, the current maturity for the control is shown as a drop-down menu thereby allowing the user to modify the current maturity of the control and enter the date the control maturity has been updated. Likewise, the target maturity of the control is listed and configured so that it can be modified by an administrator. Generally speaking, tracking the maturity status of a control is an administrative process and typically only administrative personnel or teams having authority to modify the control maturity fields have the ability to access the control maturity level page and modify the maturity levels.

FIG. 18E is a screenshot of the control maturity verification checklist tab 1812. As illustrated, the checklist enables the user to identify the criteria the control has attained. Various pieces of information are available for the user to determine whether the control has met a particular criterion. For example, for criterion IR3 (1813), in order to be satisfied, process maps must be created and stored in the ARIS database, which is included in the Control Processes module 1410B of FIG. 15. In the right-hand column 1814, internal and/or external links to document repositories, information, such as assistance information, and other resources are listed for the assistance of the user.

Figure 18F:
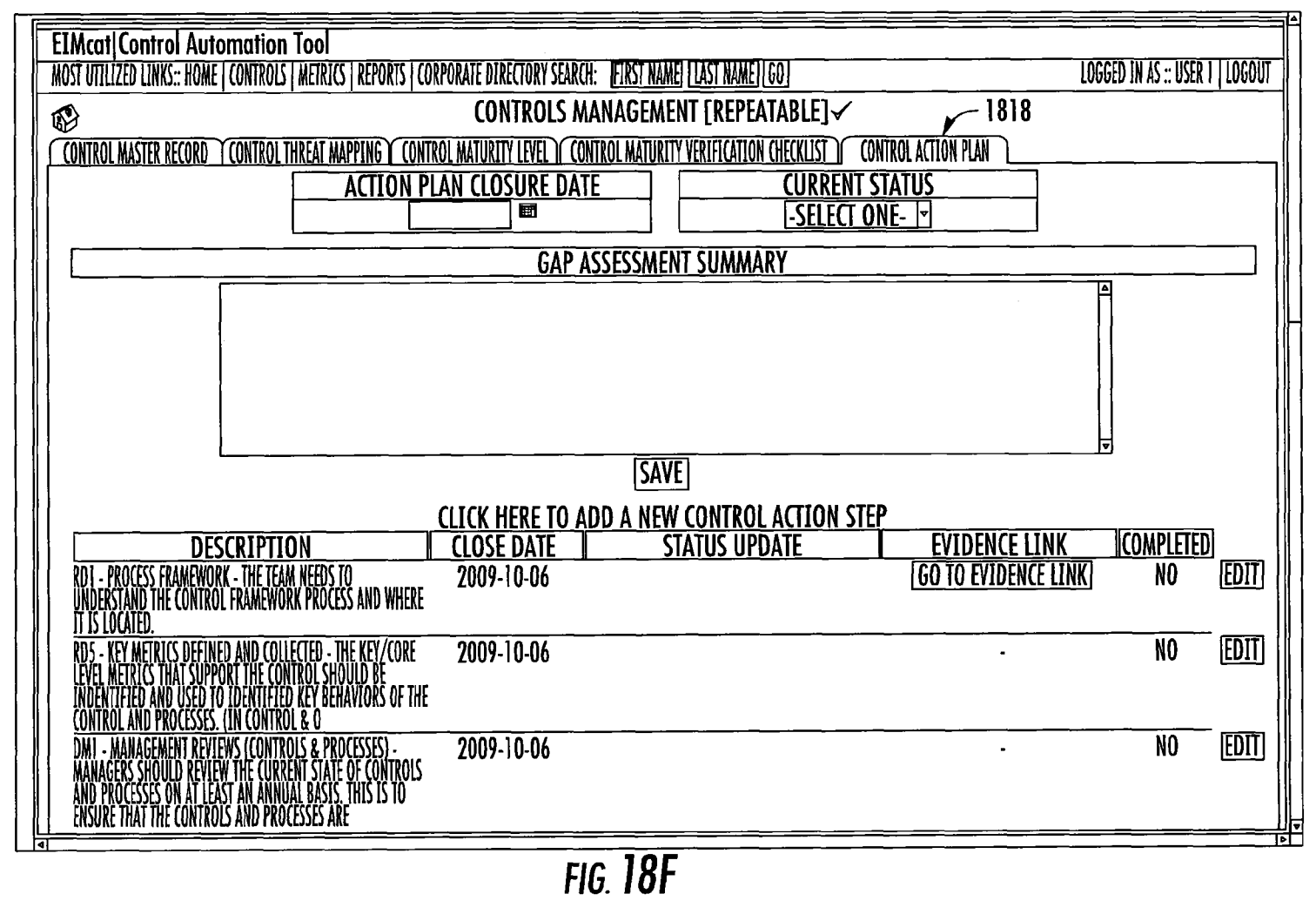

FIG. 18F is a screenshot of the control action plan tab 1818. The action plan, as discussed above, is used for general identification, tracking and closure of activities required to complete gaps, handle management issues with the controls, and create tasks for control and metric teams. The screen enables the user to add action plan steps as desired, but in order to indicate that an action step is completed; evidence must have been submitted tending to prove the step has been completed. Once the action plan as a whole is completed, i.e., once all the control action steps have been completed, the action plan may be closed and archived in order to document the actions taken to improve a control's maturity or a metric's performance.

Figure 18G:
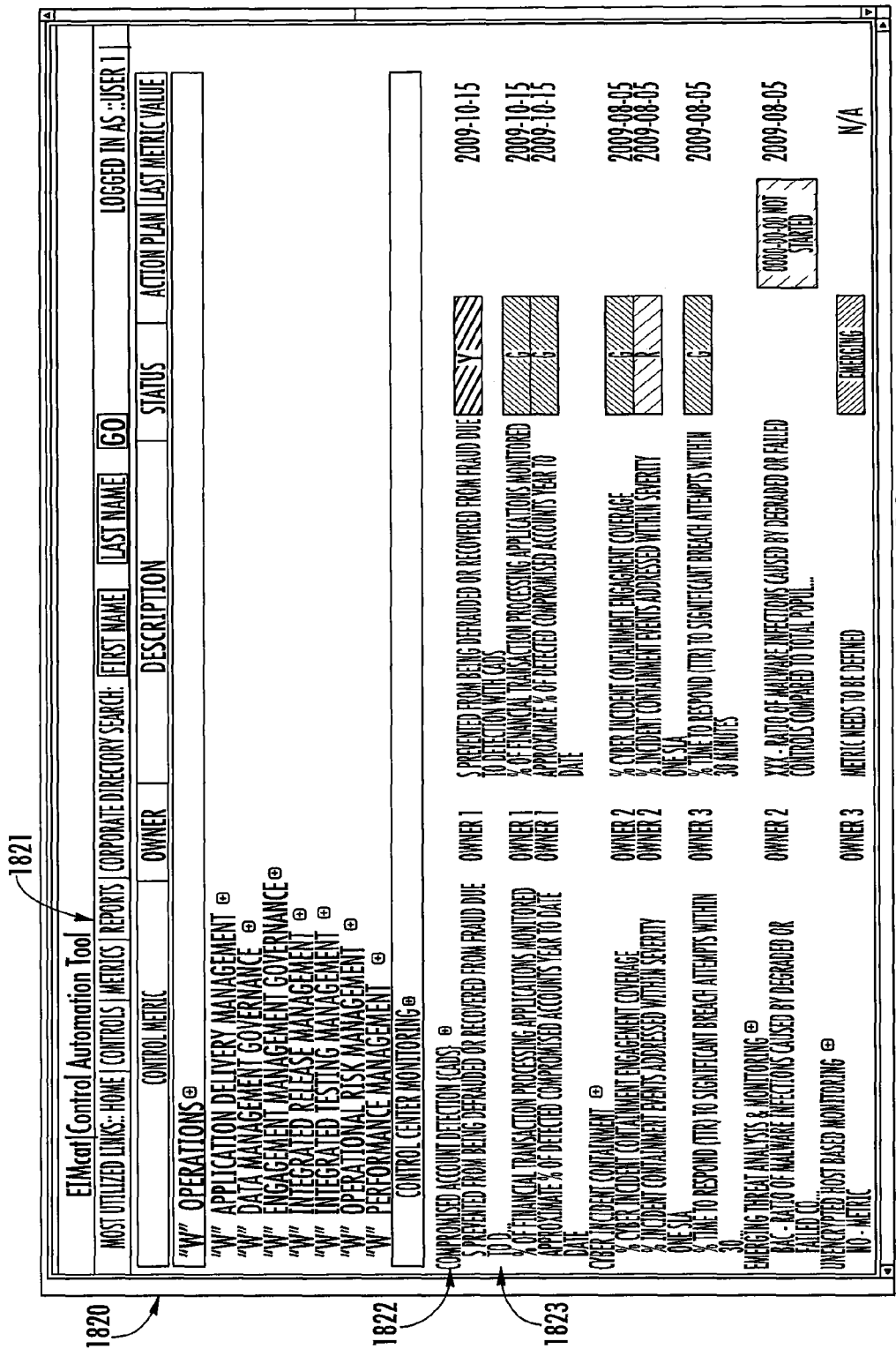

FIG. 18G is a screenshot of the metric dashboard 1820. Choosing the metrics tab 1821 near the top of the CAT screen navigates the user to this metrics dashboard 1820. Primarily, this screen provides an entry into information and management of every metrics in the CAT 1400. In various embodiments, the controls and metrics are organized in different configurations based on the administration's preferences. For example, in one embodiment, the metric dashboard 1820 is organized based on the organizational hierarchy to enable control and metric owners to view all their associated metrics on the same screen. This functionality is enabled by the interaction between the control and metric modules with the organizational hierarchy module 1450 described above. As another example, in the embodiment shown, the controls are listed by operational grouping, and the metrics associated with a particular control are listed underneath the particular control. In the embodiment illustrated, for example, the "Compromised Account Detection" control 1822 has three associated metrics including "prevented from being defrauded or recovered from fraud due to detection with CAD" 1823. Similar to the control dashboard, the metrics are color-coded to indicate the status of the metric. The metric can be emerging or new, which in this embodiment is indicated by the background color blue. Further, once the metric has been measured, as discussed above, the status is red, yellow or green depending on the range of values the current value of the metric falls into.

Figure 18H:
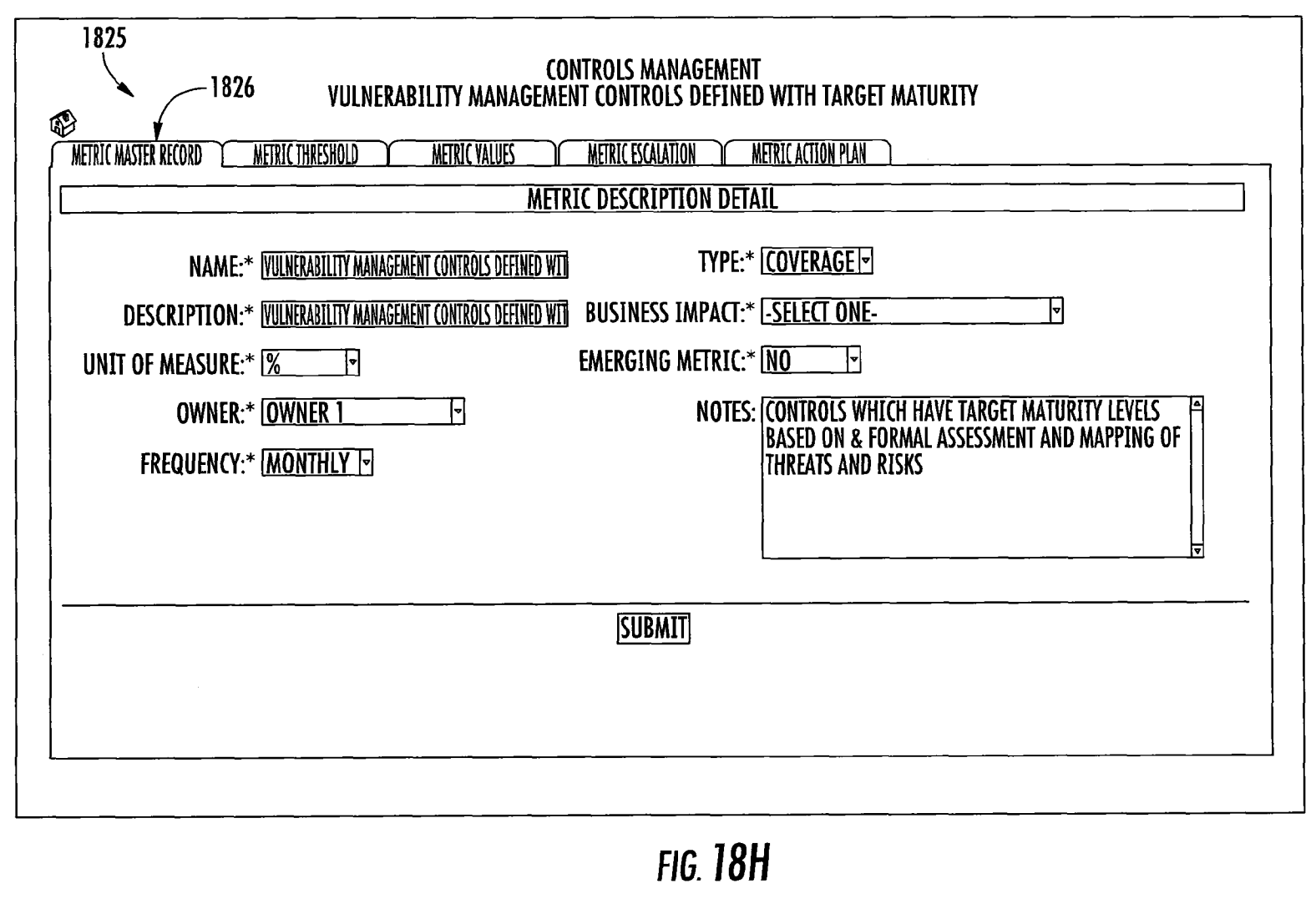

FIG. 18H is a screenshot of the metric tab screen 1825 that the user can navigate to by choosing the particular metric desired from the metric dashboard 1820. The metric master record tab 1826 is chosen in the screenshot of this figure, and as illustrated, fields for inputting the name, description, unit of measure, owner, frequency (of measure), type of metric, business impact, whether the metric is emerging (new), and a field for notes concerning the metric are provided for the metric owner's use.

FIG. 18I is a screenshot of the metric threshold tab 1827 illustrating for the user the metric value thresholds. The user has the ability to enter the ranges for classifying a metric as a "green," "yellow," or "red" metric. As discussed above, the range (or color) of the status of a particular metric indicates, in an easily accessible manner, to the user the necessity of taking corrective action or simply maintaining the status quo of the metric.

FIG. 18J is a screenshot of the metric values tab 1830 illustrating the ability to enter information concerning the value of the metric at its various assessments. Furthermore, this tab 1830 provides the user the opportunity to dictate the region, population, or otherwise where the metric is measured and assessed. Finally, the tab 1830 also includes detail regarding the history of the assessment values of the metric. This data, that is captured once entered at each assessment, provides support for trend and variance analysis. Variance analysis involves using the thresholds as lower and upper limits and focusing on the delta differences of measured metric values or running averages.

FIG. 18K is a screenshot of the assessment schedule page 1840. This provides the maturity assessment schedule based on the dates entered by the user in at the control maturity level tab 1811 at the control tab page 1805. There are numerous other reports available for the user such as, for example, a control maturity progress report presenting the maturity levels for controls in each maturity level category and the control distribution report presenting the number of controls in each functional area. Other reports include, for example, controls lists, metrics lists, current metrics reports, emerging metrics reports, yellow and red metrics reports, and control dashboard reports. The reports are depicted in various formats such as bar graphs, pie charts, spreadsheets and various other data illustration techniques.

The CAT 1400 provides the opportunity to combine modules from various areas within an organization in an effective and efficient system for managing controls and their metrics and gathering and analyzing data related to the controls and the metrics. The analysis capabilities of the CAT 1400, typically coordinated and managed by the control management module 1405 in some embodiments, include correlation of a group of controls and metrics to derive a composite view of an operational state. For example, examining the relationship of software installations to hardware units that may be eligible for the software. This examination results in the identification of needs for additional software and/or hardware. Another example of the capabilities of the CAT 1400 involves identification of staffing levels for each control. This can provide an organization the opportunity to realign staff based on the controls' maturity and its supporting metrics as necessary to maximize resources. Another example of the capabilities of the CAT 1400 involves supporting financial planning and investment operations by mapping one or more controls to the business justification within the plan. Use of designated funding can be specific to particular gap closure efforts through action plans or otherwise or can be specific to risk reduction improvement through use of particular controls. This functionality is enabled through the interaction of the Projects/Business Case Financials module 1425 with the CAT 1400. Another example of the capabilities of the CAT 1400 involves combining control and supporting metrics based on a common set of threats to be mitigated. This provides insight and understanding and a sort of "measurement" shedding light on the potential impact of toxic combinations of threats.

The general technical elements of the CAT 1400 include a web-based application environment as described regarding the interface 1800 and one or more SQL databases comprising a number of relational database tables. As described above, the various modules of the CAT 1400 may include one or more SQL database structures interacting with one another to form the CAT 1400. In other embodiments, other database structures are used. In one embodiment, the programming language used is PHP5 and the database characteristics include MySQL 5 relational databases, the CAT application running on one or more servers connected with one or more workstations throughout an organization. An example configuration is shown in FIG. 13. In such a configuration, the workstation or computer system would be running a control automation tool application providing the user with access to the CAT 1400 interface 1800. The one or more servers and one or more workstations communicate via an intranet, the Internet, other networks, or a combination of the same. In one embodiment, for security purposes, a workstation is considered any computing device running the control automation tool application and a web browser, and is connected to the organization's internal network exclusively. The workstations are computing devices such as personal computers, laptops, personal digital assistant, smart-phones, or the like.

Also, in some embodiments, the database(s) feature application access permissions which enable the CAT to exclude undesired users and include desired users giving them appropriate accessibility to administration's desired functionality of the CAT 1400. In some embodiments, the server environment used includes a LAMP configuration including a CentOS Linux operating system, Apache web server, MySQL database structure, and PHP coding. In construction of the CAT 1400 system, an iterative development process was used and is continually used to improve the CAT 1400 system. Various support tools were and are also used such as CodeIgniter PHP Framework: Model View Controller (MVC) Framework and Mantis, which is bug tracking software.

Various objects and classes were used in the coding of the CAT 1400 including object classes to support discrete functional objects thereby enabling complex logical attributes to be used for input, validation and storage of data such as data regarding the controls and metrics. Also, management classes for users, controls, metrics, action plans, threats, delegations, history, integrations, profiles and various other classes were used in construction of the modules of the CAT 1400 system.

The CAT 1400 system also includes an integration with the people directory system of the enterprise support systems as discussed above. This is accomplished using LDAP. Another integration with the enterprise support systems is the transactional data exchange between the databases of the various modules and systems.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Similarly, embodiments of the present invention may also include components or elements referred to herein as "modules." Modules, as discussed in greater detail above, may take the form of an entirely hardware embodiment or an embodiment combining software and hardware aspects. Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator- and/or human-implemented steps in order to carry out an embodiment of the present invention.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention, unless the context clearly indicates otherwise. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

What is claimed is:

1. A control automation method for assisting an organization comprising one or more users with managing one or more controls for mitigating one or more risks or threats and managing one or more metrics corresponding to the one or more controls, the one or more metrics for providing quantitative and repeatable processes for use in determining an effectiveness of the one or more controls, the control automation method comprising:
   using a computer processor to execute computer program code instructions stored in a non-transitory computer-readable medium, wherein the computer program code instructions are structured to cause the computer processor to:
      receive, from the user, and store one or more control profiles each comprising a plurality of parameters defining the one or more controls, wherein at least one of said plurality of parameters is selected from a group consisting of correlated control information, correlated metric information, security level information, effectiveness calculation algorithm information, effectiveness calculation results information, and effectiveness calculation criteria information;
      receive, from the user, and store one or more metric profiles each comprising a plurality of parameters defining the one or more metrics, wherein at least one of said plurality of parameters is selected from a group consisting of a unit of measure, a frequency of reporting, a type of metric, a relevance of the metric to one or more controls, and a threshold level for evaluating progress toward a goal of the metric;
      receive user input choosing one or more of the metrics for association with the one or more controls;
      map the metrics chosen by the user to the one or more controls, such that the metrics chosen by the user become associated with the one or more controls and can provide quantitative and repeatable process data for use in determining the effectiveness of the one or more controls;
      receive and store one or more metric values corresponding to the one or more metrics; and
      provide information corresponding to the one or more metric values to the user for assisting the user in determining the effectiveness of the one or more controls.

2. The control automation method of claim 1 wherein the computer processor is further to:
   receive user input choosing one or more risk and threat profiles from a risk and threat master profile database, the one or more risk and threat profiles including information regarding managing one or more risks and threats; and
   map the chosen risk and threat profiles to the one or more controls such that the one or more risks and threats are mitigated by implementation of the one or more controls.

3. The control automation method of claim 2 wherein the computer processor is further to:
   determine a target maturity state for one or more of the controls based at least in part on the risks and threats mapped to the one or more controls.

4. The control automation method of claim 3 wherein the computer processor is further to:
   receive and store information from the user corresponding to one or more control maturity verification checklist criteria;
   identify one or more gaps requiring attention, based at least in part on the information received from the user corresponding to one or more control maturity verification checklist criteria, in order for one or more of the controls to attain the target maturity state; and develop one or more action plans comprising one or more action plan steps, the one or more action plans created to assist in closing the one or more identified gaps.

5. The control automation method of claim 4 wherein identifying one or more gaps requiring attention comprises:

retrieving one or more gap profiles from an operational and regulatory gap profile repository; and wherein identifying the one or more gaps requiring attention comprises:

comparing the one or more gap profiles with a potential gap to determine whether the potential gap is a gap requiring attention.

6. The control automation method of claim 1 wherein the computer processor is further to:

receive and store information from the user corresponding to one or more control maturity verification checklist criteria;

identify one or more gaps requiring attention, based at least in part on the information received from the user corresponding to one or more control maturity verification checklist criteria, in order for one or more of the controls to attain a target maturity state; and develop one or more action plans comprising one or more action plan steps, the one or more action plans created to assist in closing the one or more identified gaps.

7. The control automation method of claim 6 wherein identifying one or more gaps requiring attention comprises:

retrieving, one or more gap profiles from an operational and regulatory gap profile repository; and comparing the one or more gap profiles with a potential gap to determine whether the potential gap is a gap requiring attention.

8. The control automation method of claim 1 wherein the computer processor is further to:

determine the effectiveness of the one or more controls based at least in part on the one or more metric values; and wherein:

the information provided to the user for assisting the user in determining the effectiveness of the one or more controls comprises the effectiveness determined using the processor.

9. The control automation method of claim 1 wherein the computer processor is further to:

providing the user a people repository comprising information corresponding to the people within the organization.

10. The control automation method of claim 9 wherein the computer processor is further to:

receive user input choosing one or more people from the people repository and user input choosing one or more preferences corresponding to the one or more chosen people; and map the people chosen by the user to one or more of the controls based at least in part on the one or more chosen preferences.

11. The control automation method of claim 1 wherein the computer processor is further to:

retrieve policy information from a policy repository, the policy information corresponding to one or more organization policies and standards; and modify one or more parameters of the control and metrics such that the parameters are aligned with the policy information.

12. The control automation method of claim 1 wherein the computer processor is further to:

retrieve business functional classification information from a business and operational functions repository; and group based at least in part on the business functional classification information, some or all of the controls and metrics.

13. The control automation method of claim 1 wherein the computer processor is further to:

retrieve information regarding at least one of budgetary funding allocations, people allocations, and action plans from a projects and business case financials repository; and modify one or more parameters of the control and metrics such that the parameters are aligned with the information.

14. A computer program product configured for assisting an organization comprising one or more users with managing one or more controls for mitigating one or more risks or threats and managing one or more metrics corresponding to the one or more controls, the one or more metrics for providing quantitative and repeatable processes for use in determining an effectiveness of the one or more controls, the computer program product comprising a non-transitory computer-readable medium, the non-transitory computer-readable medium having computer-readable instructions stored therein, the instructions comprising:

instructions for receiving, from the user, and storing one or more control profiles each comprising a plurality of parameters defining the one or more controls, wherein at least one of said plurality of parameters is selected from a group consisting of correlated control information, correlated metric information, security level information, effectiveness calculation algorithm information, effectiveness calculation results information, and effectiveness calculation algorithm information, effectiveness calculation results information, or effectiveness calculation criteria information;

instructions for receiving, from the user, and storing one or more metric profiles each comprising a plurality of parameters defining the one or more metrics, wherein at least one of said plurality of parameters is selected from a group consisting of a unit of measure, a frequency of reporting, a type of metric, a relevance of the metric to one or more controls, and a threshold level for evaluating progress toward a goal of the metric;

instructions for receiving user input choosing one or more of the metrics for association with the one or more controls;

instructions for mapping the metrics chosen by the user to the one or more controls, such that the metrics chosen by the user become associated with the one or more controls and can provide quantitative and repeatable process data for use in determining the effectiveness of the one or more controls;

instructions for receiving and storing one or more metric values corresponding to the one or more metrics; and instructions for providing information corresponding to the one or more metric values to the user for assisting the user in determining the effectiveness of the one or more controls.

15. The computer program product of claim 14, the computer readable instructions further comprising:

instructions for receiving user input choosing one or more risk and threat profiles from a risk and threat master profile database, the one or more risk and threat profiles including information regarding managing one or more risks and threats; and instructions for mapping, using a processor, the chosen risk and threat profiles to the one or more controls such that the one or more risks and threats are mitigated by implementation of the one or more controls.

16. The computer program product of claim 15, the computer readable instructions further comprising:
instructions for determining, using a processor, a target maturity state for one or more of the controls based at least in part on the risks and threats mapped to the one or more controls.

17. The computer program product of claim 16, the computer readable instructions further comprising:
instructions for receiving and storing information from the user corresponding to one or more control maturity verification checklist criteria;
instructions for identifying, using a processor, one or more gaps requiring attention, based at least in part on the information received from the user corresponding to one or more control maturity verification checklist criteria, in order for one or more of the controls to attain the target maturity state; and
instructions for developing, using a processor, one or more action plans comprising one or more action plan steps, the one or more action plans created to assist in closing the one or more identified gaps.

18. The computer program product of claim 17, the computer readable instructions further comprising:
instructions for retrieving, using a processor, one or more gap profiles from an operational and regulatory gap profile repository; and wherein the instructions for identifying one or more gaps requiring attention comprise:
instructions for comparing, using a processor, the one or more gap profiles with a potential gap to determine whether the potential gap is a gap requiring attention.

19. The computer program product of claim 14, the computer readable instructions further comprising:
instructions for receiving and storing information from the user corresponding to one or more control maturity verification checklist criteria;
instructions for identifying, using a processor, one or more gaps requiring attention, based at least in part on the information received from the user corresponding to one or more control maturity verification checklist criteria, in order for one or more of the controls to attain a target maturity state; and
instructions for developing, using a processor, one or more action plans comprising one or more action plan steps, the one or more action plans created to assist in closing the one or more identified gaps.

20. The computer program product of claim 19, the computer readable instructions further comprising:
instructions for retrieving, using a processor, one or more gap profiles an operational and regulatory gap profile repository; and
instructions for comparing, using a processor, the one or more gap profiles with a potential gap to determine whether the potential gap is a gap requiring attention.

21. The computer program product of claim 14, the computer readable instructions further comprising:
instructions for determining, using a processor, the effectiveness of the one or more controls based at least in part on the one or more metric values; and wherein:
the instructions for providing information to the user for assisting the user in determining the effectiveness of the one or more controls comprise instructions for providing the effectiveness determined using the processor.

22. The computer program product of claim 14, the computer readable instructions further comprising:
Instructions for providing the user a people repository comprising information corresponding to the people within the organization.

23. The computer program product of claim 22, the computer readable instructions further comprising:
instructions for receiving user input choosing one or more people from the people repository and user input choosing one or more preferences corresponding to the one or more chosen people; and
instructions for mapping, using a processor, the people chosen by the user to one or more of the controls based at least in part on the one or more chosen preferences.

24. The computer program product of claim 14, the computer readable instructions further comprising:
instructions for retrieving, using a processor, policy information from a policy repository, the policy information corresponding to one or more organization policies and standards; and
modifying, using a processor, one or more parameters of the control and metrics such that the parameters are aligned with the policy information.

25. The computer program product of claim 14, the computer readable instructions further comprising:
instructions for retrieving, using a processor, business functional classification information from a business and operational functions repository; and
instructions for grouping, using a processor, based at least in part on the business functional classification information, some or all of the controls and metrics.

26. The computer program product of claim 14, the computer readable instructions further comprising:
instructions for retrieving, using a processor, information regarding at least one of budgetary funding allocations, people allocations, and action plans from a projects and business case financials repository; and
instructions for modifying, using a processor, one or more parameters of the control and metrics such that the parameters are aligned with the information.

27. A control automation system configured for assisting an organization comprising one or more users with managing one or more controls for mitigating one or more risks or threats and managing one or more metrics corresponding to the one or more controls, the one or more metrics for providing quantitative and repeatable processes for use in determining an effectiveness of the one or more controls, the control automation system comprising:
a workstation module configured for providing access to the control automation system for the one or more users and providing an interface enabling the one or more users to interact with the control automation system;
a control management module configured for communicating with the workstation module;
a metric repository configured for communicating with the control management module and configured for receiving, from the user, and storing one or more metric profiles each comprising a plurality of parameters defining the one or more metrics, wherein at least one of said plurality of parameters is selected from a group consisting of a unit of measure, a frequency of reporting, a type of metric, a relevance of the metric to one or more controls, and a threshold level for evaluating progress toward a goal of the metric;
a control repository configured for communicating with the control management module, the control repository comprising:

a control profile and process module configured for:
receiving user input regarding one or more control profiles each comprising a plurality of parameters defining the one or more controls from the workstation module by way of the control management module, wherein at least one of said plurality of parameters is selected from a group consisting of correlated control information, correlated metric information, security level information, effectiveness calculation algorithm information, effectiveness calculation results information, and effectiveness calculation algorithm information;
receiving user input choosing one or more of the metrics from the workstation module by way of the control management module, the user choosing one or more of the metrics for association with the one or more controls;
mapping the metrics chosen by the user to the one or more controls, such that the metrics chosen by the user become associated with the one or more controls and can provide quantitative and repeatable process data for use in determining the effectiveness of the one or more controls;
receiving user input regarding one or more metric values corresponding to the one or more metrics from the workstation module by
way of the control management module; and
communicating information corresponding to the one or more metric values to the user by way of the control management module and the workstation module, the information for assisting the user in determining the effectiveness of the one or more controls.

28. The control automation system of claim 27 wherein the control automation system further comprises:
a risk and threat master profile module configured for storing a plurality of risk and threat profiles, and wherein the control repository further comprises:
a risk profile module configured for receiving user input choosing one or more risk and threat profiles from the risk and threat master profile module from the workstation module by way of the control management module,
the control profile and process module further configured for mapping the chosen risk and threat profiles to the one or more controls such that the one or more risks and threats are mitigated by implementation of the one or more controls.

29. The control automation system of claim 28 wherein the control repository further comprises:
a maturity assessment module configured for determining a target maturity state for one or more of the controls based at least in part on the risks and threats mapped to the one or more controls.

30. The control automation system of claim 27 wherein the maturity assessment module is further configured for:
receiving, from the workstation module by way of the control management module, information from the user corresponding to one or more control maturity verification checklist criteria, and wherein the control repository further comprises:
a gap profiles module configured for identifying one or more gaps requiring attention, based at least in part on the information received from the user corresponding to one or more control maturity verification checklist criteria, in order for one or more controls to attain a target maturity state; and
an action plan module configured for developing one or more action plans comprising one or more action plan steps, the one or more action plans created to assist in closing the one or more identified gaps.

31. The control automation system of claim 30 wherein the gap profile module is further configured for:
retrieving one or more gap profiles and
comparing the one or more gap profiles with a potential gap to determine whether the potential gap is a gap requiring attention.

32. The control automation system of claim 27 wherein:
the control management module is configured for determining the effectiveness of the one or more controls based at least in part on the one or more metric values; and wherein:
the information provided to the user for assisting the user in determining the effectiveness of the one or more controls comprises the effectiveness determined by the control management module.

33. The control automation system of claim 27 further comprising:
a people resources module configured for communicating with the control management module and providing the user a people repository comprising information corresponding to the people within the organization.

34. The control automation system of claim 33 wherein the control repository is further configured for:
receiving user input from the workstation module by way of the control management module, the user input comprising choosing one or more people from the people repository and choosing one or more preferences corresponding to the one or more chosen people; and
mapping the people chosen by the user to one or more of the controls based at least in part on the one or more chosen preferences.

35. The control automation system of claim 27 further comprising:
a policy and standards module, and wherein the control management module is further configured for:
retrieving policy information from the policy and standards module, the policy information corresponding to one or more organization policies and standards; and wherein the control repository is further configured for:
modifying one or more parameters of the controls such that the parameters are aligned with the policy information.

36. The control automation system of claim 27 further comprising:
a policy and standards module, and wherein the control management module is further configured for:
retrieving policy information from the policy and standards module, the policy information corresponding to one or more organization policies and standards; and wherein the metric repository is further configured for:
modifying one or more parameters of the metrics such that the parameters are aligned with the policy information.

37. The control automation system of claim 27 further comprising:
a business and operational functions module, and wherein the control management module is further configured for:
retrieving business functional classification information from the business and operational functions module; and
grouping, using a processor, based at least in part on the business functional classification information, some or all of the controls and metrics.

38. The control automation system of claim 27 further comprising:

a projects and business case financials module, and wherein the control management module is further configured for:

retrieving information regarding at least one of budgetary funding allocations, people allocations, and action plans from the projects and business case financials module; and modifying one or more parameters of the controls and metrics such that the parameters are aligned with the information.

39. An apparatus for assisting an organization comprising one or more users with managing one or more controls for mitigating one or more risks or threats and managing one or more metrics corresponding to the one or more controls, the one or more metrics for providing quantitative and repeatable processes for use in determining an effectiveness of the one or more controls, the apparatus comprising:

means for receiving, from the user, and storing one or more control profiles each comprising a plurality of parameters defining the one or more controls, wherein at least one of said plurality of parameters is selected from a group consisting of correlated control information, correlated metric information, security level information, effectiveness calculation algorithm information, effectiveness calculation results information, and effectiveness calculation algorithm information;

means for receiving, from the user, and storing one or more metric profiles each comprising a plurality of parameters defining the one or more metrics, wherein at least one of said plurality of parameters is selected from a group consisting of a unit of measure, a frequency of reporting, a type of metric, a relevance of the metric to one or more controls, and a threshold level for evaluating progress toward a goal of the metric;

means for receiving user input choosing one or more of the metrics for association with the one or more controls;

means for mapping the metrics chosen by the user to the one or more controls, such that the metrics chosen by the user become associated with the one or more controls and can provide quantitative and repeatable process data for use in determining the effectiveness of the one or more controls;

means for receiving and storing one or more metric values corresponding to the one or more metrics; and means for providing information corresponding to the one or more metric values to the user for assisting the user in determining the effectiveness of the one or more controls.

40. The apparatus of claim 39 further comprising:

means for receiving user input choosing one or more risk and threat profiles from a risk and threat master profile database, the one or more risk and threat profiles including information regarding managing one or more risks and threats; and means for mapping the chosen risk and threat profiles to the one or more controls such that the one or more risks and threats are mitigated by implementation of the one or more controls.

41. The apparatus of claim 40 further comprising:

means for determining a target maturity state for one or more of the controls based at least in part on the risks and threats mapped to the one or more controls.

42. The apparatus of claim 40 further comprising:

means for receiving and storing information from the user corresponding to one or more control maturity verification checklist criteria;

means for identifying one or more gaps requiring attention, based at least in part on the information received from the user corresponding to one or more control maturity verification checklist criteria, in order for one or more of the controls to attain a target maturity state; and means for developing one or more action plans comprising one or more action plan steps, the one or more action plans created to assist in closing the one or more identified gaps.

* * * * *